United States Patent
Sato

(10) Patent No.: US 9,036,900 B2
(45) Date of Patent: May 19, 2015

(54) THREE-DIMENSIONAL SHAPE MEASUREMENT METHOD AND THREE-DIMENSIONAL SHAPE MEASUREMENT DEVICE

(75) Inventor: Kunihiro Sato, Kobe (JP)

(73) Assignee: University of Hyogo, Kobe-shi (JP)

( * ) Notice: Subject to any disclaimer, the term of this patent is extended or adjusted under 35 U.S.C. 154(b) by 121 days.

(21) Appl. No.: 13/980,775

(22) PCT Filed: Jan. 19, 2012

(86) PCT No.: PCT/JP2012/051125
§ 371 (c)(1),
(2), (4) Date: Jul. 19, 2013

(87) PCT Pub. No.: WO2012/099220
PCT Pub. Date: Jul. 26, 2012

(65) Prior Publication Data
US 2013/0301909 A1    Nov. 14, 2013

(30) Foreign Application Priority Data

Jan. 21, 2011 (JP) ................................ 2011-010842

(51) Int. Cl.
*G06K 9/00* (2006.01)
*G06T 7/60* (2006.01)
(Continued)

(52) U.S. Cl.
CPC . *G06T 7/60* (2013.01); *G01B 11/25* (2013.01); *G03H 1/0443* (2013.01); *G03H 1/0866* (2013.01); *G03H 2001/0445* (2013.01);
(Continued)

(58) Field of Classification Search
None
See application file for complete search history.

(56) References Cited

U.S. PATENT DOCUMENTS

| | | | |
|---|---|---|---|
| 6,246,495 B1 * | 6/2001 | Yamaguchi | 359/11 |
| 6,262,818 B1 | 7/2001 | Cuche et al. | |
| 8,416,669 B2 | 4/2013 | Sato | |
| 2009/0238449 A1 * | 9/2009 | Zhang et al. | 382/165 |
| 2013/0100241 A1 | 4/2013 | Sato | |

FOREIGN PATENT DOCUMENTS

| | | |
|---|---|---|
| JP | 3-12684 B2 | 2/1991 |
| JP | 2002-526815 A | 8/2002 |

(Continued)

OTHER PUBLICATIONS

Corresponding International Search Report with English Translation dated Apr. 17, 2012 ( five (5) pages).

*Primary Examiner* — Vikkram Bali
*Assistant Examiner* — Tracy Mangialaschi
(74) *Attorney, Agent, or Firm* — Crowell & Moring LLP

(57) ABSTRACT

This three-dimensional shape measurement method comprises: a projection step for projecting an interference fringe pattern (F) having a single spatial frequency (fi) onto an object surface; a recording step for recording the pattern (F) as a digital hologram; and a measurement step for generating a plurality of reconstructed images having different focal distances from the hologram, and deriving the distance to each point on the object surface by applying a focusing method to the pattern (F) on each of the reconstructed images. The measurement step extracts the component of the single spatial frequency (fi) corresponding to the pattern (F) from each of the reconstructed images by spatial frequency filtering, upon applying the focusing method, and makes it possible to achieve a highly accurate measurement in which the adverse effect of speckles is reduced and the advantage of a free-focus image reconstruction with holography is used effectively.

20 Claims, 14 Drawing Sheets

(51) Int. Cl.
*G01B 11/25* (2006.01)
*G03H 1/04* (2006.01)
*G03H 1/08* (2006.01)
*G03H 1/00* (2006.01)

(52) U.S. Cl.
CPC ........ *G03H 2210/30* (2013.01); *G03H 2210/62* (2013.01); *G03H 2222/35* (2013.01); *G03H 2222/44* (2013.01); *G03H 2223/18* (2013.01); *G03H 2001/0033* (2013.01)

(56) References Cited

FOREIGN PATENT DOCUMENTS

| | | |
|---|---|---|
| JP | 2003-232619 A | 8/2003 |
| JP | 2007-71793 A | 3/2007 |
| JP | 2007-113974 A | 5/2007 |
| JP | 4023666 B2 | 12/2007 |
| WO | WO 2011/089820 A1 | 7/2011 |
| WO | WO 2012/005315 A1 | 1/2012 |

* cited by examiner

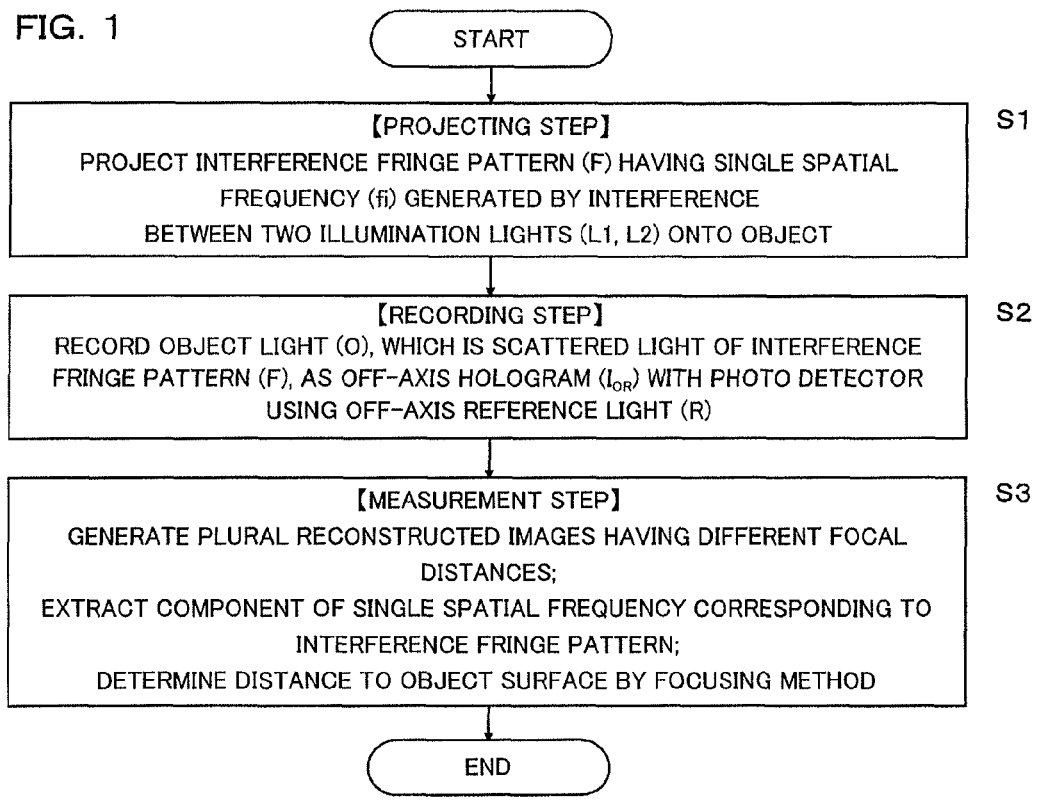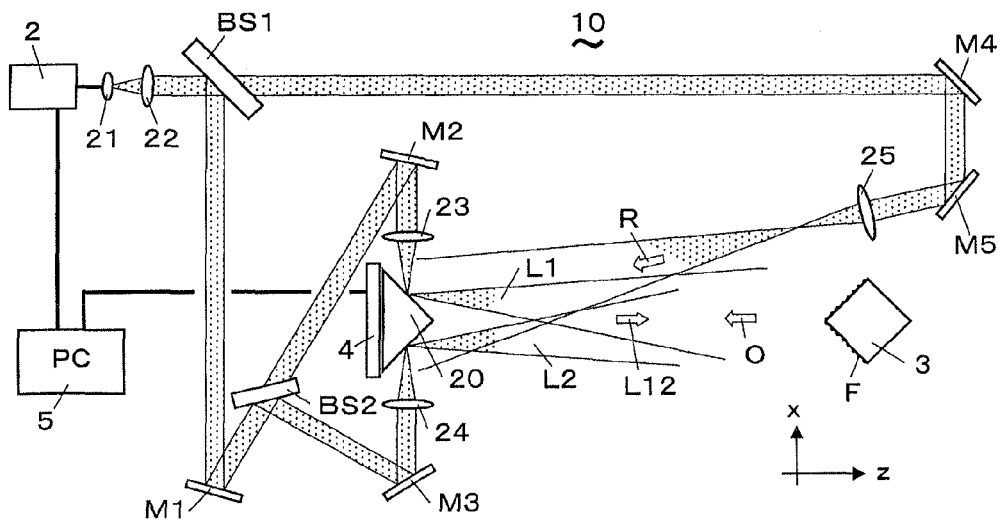

THREE-DIMENSIONAL SHAPE MEASUREMENT METHOD AND THREE-DIMENSIONAL SHAPE MEASUREMENT DEVICE

TECHNICAL FIELD

The present invention relates to a method for measuring a three-dimensional shape and a device for measuring a three-dimensional shape using digital holography.

BACKGROUND ART

Conventionally, various optical three-dimensional measurement methods applied to a rough surface object are known as a method for measuring a shape of an object surface by non-contact. For example, some methods are known which use a lattice image distorted by a target object from an original lattice pattern projected onto the object with a projector. Followings are included in these methods: a moire method taking a picture of the lattice image as a moire image (contour line); a phase shifting method taking a picture of the lattice image by changing the phase of light; and a spatial code method deriving space coordinates for groups of points distributed on a surface from focus locations in an image. Furthermore, a spot light method which takes an image of spots on an object illuminated with light beams and derives their space coordinates from focus locations in the image, and a light-section method which illuminates an object with a slit light and derives a series of points of space coordinates using focus locations in an image of a belt-like light distorted on the object are known. In addition, there is a stereo method using two pictures taken from two directions centering on the object. However, these measurement methods mainly measure a static object, and therefore there is a limit to highly precise three-dimensional shape measurement for a moving object. Moreover, these methods use an image formation lens for a projector or a photographing optical system (camera), therefore measurement errors caused by distortion of image or focal gap, etc. occur and an accuracy of three-dimensional measurement is limited.

In recent years, three-dimensional range finding cameras etc. using TOF method are presented which can measure distances to an object via phase differences between an original modulated signal and a returned light's modulated signal, where the returned light is obtained, first, emitting an intensity modulated light of a pulse laser light or a CW laser light to the object and, second, recording a scattered-reflected light from the object surface at a rate of 30 frames per second. However, its distance measurement accuracy is about 1 cm, and there are problems about such as speeding up of pulse-making or intensity-modulation of CW at light source, and speeding up of a signal processing circuit, etc. in order to realize accuracy of 1 mm or less.

Moreover, an interference measurement method for a shape of rough surface using holography is studied in the prior art. The holography is technology which can record an object light wave-front and reconstruct the light wave-front or an image in three-dimensional space. The interference measurement method requires two sheet holograms for generating an interference fringe pattern, and therefore a measuring target is fundamentally restricted to a static object. Moreover, the interference measurement method usually uses interference fringe pattern analysis or phase connection. The phase connection tends to cause errors under the influence of speckles. The speckles arise in the interference measurement for a shape of rough surface. Furthermore, the contrasts in the observed interference fringes deteriorate upon coming off the object surface and localize near the object surface. The speckles and the localization of the interference fringes cause errors easily in the phase connection of the interference fringe pattern. In other words, the interference fringe pattern analysis and phase connection indispensable for the interference measurement method tend to cause errors for an object with large depth or an object of a complicated shape with discontinuity surface, and therefore this interference measurement method is not suitable for high precision three-dimensional measurement.

Incidentally, there is a method called as a shape-from-focus method for obtaining an object shape using contrasts in object images recorded with an image sensor. The shape-from-focus method determines the object surface position by searching an in-focus position (a focusing point) of an object surface from among the recorded images which are recorded by changing the focal distance of a lens. However, it is necessary to record a plurality of images of different focal distances at once to perform three-dimensional measurement of a moving object by the shape-from-focus method. Thus, as a method for realizing dynamic shape measurement of a micro component, a shape-from-focus method using holography is proposed which takes advantage of the free focal image reconstruction of holography (for example, refer to patent document 1).

PRIOR ART DOCUMENTS

Patent Documents

Patent document 1: Japanese Patent No. 4023666

DISCLOSURE OF THE INVENTION

However, the measurement method using the shape-from-focus method shown in the patent document 1 mentioned above is applied to as measuring objects parts which reflect lights like a mirror or a lens, and therefore it is not applicable to a rough surface object which emits scattered lights. This is because there is a problem that the accuracy of measurement falls remarkably by a speckle noise; the speckles (speckle pattern) are generated when a rough surface object is irradiated with a laser beam. One can say, therefore, that no three-dimensional highly precise measurement method of a shape of a moving object is known conventionally. Here, the meaning of "measurable with high precision" is to be theoretically measurable in an accuracy of a wave length of light, for example. In general, optical three-dimensional measurement, which measures a shape of an object surface by non-contact, is performed through three stages of processing: a specification stage which adds an indicator to an object surface for specifying a measuring point; a fixing stage which fixes and records the surface position to which the indicator has been added; and a measurement stage which obtains the distance to the point where the indicator is added. In the TOF method, two former stages are performed continuously. In the other method performed by irradiating an object surface with a lattice pattern light, a beam spot light, or a belt like light, etc., all three stages are performed discontinuously one by one. The specification stage is a stage for assigning a ruler. The fixing stage is a stage for acquiring images or holograms of the object to which the ruler has been assigned. The measurement stage is a stage for reading the ruler in the images or holograms. For highly precise three-dimensional measurement of a moving object, it is required to use a ruler which has an accuracy of a light wave length, and which is long enough for the phase connection to be unnecessary in the specification stage. Furthermore, a high speed recording responsible to the speed of the moving object, for example, recording with no time lag (single shot recording) in the fixing stage, and elimination of the influence of the speckles in a measurement stage are required.

The present invention is for solving the above problems, and a purpose of the present invention is to provide a method for measuring a three-dimensional shape and a device for measuring a three-dimensional shape which can realize highly precise three-dimensional measurement of a shape of a moving object by easy constitution.

In order to achieve the above purpose, the present invention provides a method for measuring a three-dimensional shape of an object surface using a digital hologram for recording an interference fringe pattern projected onto the object surface, comprising the steps of: a projection step for projecting an interference fringe pattern (F) having a single spatial frequency (fi) onto an object surface; a recording step for recording the interference fringe pattern (F) projected on the object surface by the projection step as a hologram using a photo detector; and a measurement step for generating a plurality of reconstructed images having different focal distances from the hologram recorded by the recording step, and deriving the distance to each point on the object surface by applying a focusing method to the interference fringe pattern (F) in each of the reconstructed images, wherein the measurement step comprises an interference fringe pattern extraction step for extracting the component of the single spatial frequency (fi) corresponding to the interference fringe pattern from each of the reconstructed images by spatial frequency filtering when the focusing method is applied.

In the method for measuring a three-dimensional shape, preferably the interference fringe pattern (F) projected onto the object surface in the projection step has sinusoidal light intensity.

In the method for measuring a three-dimensional shape, preferably the projection step prepares the interference fringe pattern (F), to be projected onto the object surface by interference between two mutually coherent laser beams, and projects the interference fringe pattern (F) onto the object surface so that an arrangement of the interference fringe pattern (F) seen from the light receiving surface of the photo detector may be fixed irrespective of positions of the object surface.

In the method for measuring a three-dimensional shape, preferably the recording step records the interference fringe pattern (F) as an off-axis hologram ($I_{OR}$) using an off-axis reference light (R).

In the method for measuring a three-dimensional shape, preferably the measurement step comprises a modulation step for performing spatial heterodyne modulation to a hologram based on a phase ($\phi_L$) of an in-line reference light (L) for reconstruction and a phase ($\phi_R$) of the off-axis reference light (R); a filtering step for performing spatial frequency filtering to eliminate the conjugate image component from a hologram; and a complex amplitude generation step for generating a complex amplitude in-line hologram ($J_{OL}$) from the off-axis hologram ($I_{OR}$) recorded by the recording step by performing the modulation step and the filtering step in this order or reverse order to the off-axis hologram ($I_{OR}$), and the measurement step performs the interference fringe pattern extraction step to a plurality of reconstructed images generated by changing focal distances using the complex amplitude in-line hologram ($J_{OL}$) generated by the complex amplitude generation step.

In the method for measuring a three-dimensional shape, preferably the measurement step comprises: a second modulation step for generating an object light complex amplitude in-line hologram (g) expressing an object light wave-front on a hologram plane defined with the light receiving surface of the photo detector by performing spatial heterodyne modulation to the complex amplitude in-line hologram ($J_{OL}$) generated by the complex amplitude generation step using the phase ($\phi_L$) of the in-line reference light (L) for reconstruction in order to eliminate the component of the in-line reference light (L) for reconstruction; and a plane wave expansion step for generating a wave-front hologram (h) in a predetermined focal position by performing a plane wave expansion to a transformed function (G) derived as the result of Fourier-transform of the object light complex amplitude in-line hologram (g) using Fourier spatial frequencies (u, v, w) satisfying the dispersion relation of a plane wave; wherein the measurement step determines the in-focus point (zp) using the wave-front holograms (h) generated by the plane wave expansion step.

In the method for measuring a three-dimensional shape, preferably the recording step acquires a plurality of off-axis holograms ($I_{OR}$(j)) simultaneously using a plurality of photo detectors, and the measurement step generates each of object light complex amplitude in-line holograms (g(j)) from each of the off-axis holograms ($I_{OR}$(j)), synthesizes a synthesized hologram by piling up the object light complex amplitude in-line holograms (g(j)) mutually, and uses the synthesized hologram as the object light complex amplitude in-line hologram (g).

In the method for measuring a three-dimensional shape, preferably the measurement step generates the wave-front hologram (h) by the plane wave expansion step in a focal position nearer to the object surface than the hologram plane, cuts out a minute hologram ($\Delta h$) including a measurement point (P(xp, yp)) from the wave-front hologram (h), generates a plurality of minute holograms (h') having different focal positions based on the minute hologram ($\Delta h$), and determines the in-focus point (zp) using the minute holograms (h').

In the method for measuring a three-dimensional shape, preferably the measurement step derives a Fourier-transformed function as an in-focus measure (H) by Fourier-transforming a product of a reconstructed image ($|h'|^2$) made of the square of the absolute value of the minute hologram (h') and a window function (W) using the single spatial frequency (fi), and determines the in-focus point (zp) by performing in-focus judgment based on the magnitude of the in-focus measure (H).

In the method for measuring a three-dimensional shape, preferably the window function (W) is a window function of a Gauss function type.

In the method for measuring a three-dimensional shape, preferably the measurement step derives a gradient vector ($\Delta$) of an object surface corresponding to a reconstructed image ($|\Delta h|^2$) where the reconstructed image ($|\Delta h|^2$) is made of the square of the absolute value of the minute hologram ($\Delta h$), and adjusts a window size and a window direction of the window function (W) based on the gradient vector ($\Delta$).

Further, the present invention provides a device for measuring a three-dimensional shape of an object surface using a digital hologram for recording an interference fringe pattern projected onto the object surface, comprising: a projection part which prepares an interference fringe pattern (F) having a single spatial frequency (fi) and sinusoidal light intensity by interference between two mutually coherent laser beams, and projects the interference fringe pattern (F) onto an object surface; a recording part which records the interference fringe pattern (F) projected onto the object surface by the projection part in a digital hologram as an off-axis digital hologram ($I_{OR}$)

using a photo detector; and a measurement part which generates a plurality of reconstructed images having different focal distances from the digital hologram recorded by the recording part, and derives the distance to each point on the object surface by applying a focusing method to the interference fringe pattern (F) in each of the reconstructed images, wherein the measurement part comprises an interference fringe pattern extraction part for extracting the component of the single spatial frequency (fi) corresponding to the interference fringe pattern from each of the reconstructed images by spatial frequency filtering.

In the device for measuring a three-dimensional shape, preferably the projection part projects the interference fringe pattern (F) onto the object surface so that an arrangement of the interference fringe pattern (F) seen from the light receiving surface of the photo detector may be fixed irrespective of positions of the object surface.

According to the three-dimensional shape measurement method of the present invention, because an interference fringe pattern having a single spatial frequency is extracted from a hologram in which a projected image is recorded and to which a focusing method is applied, the influence of the noise due to speckles is reduced or eliminated, and highly precise three-dimensional measurement can be realized. Moreover, because this method can obtain absolute distance from a calculation of an in-focus measure using free focal images, such a problem of a phase jump of an interference fringe pattern or an interference fringe pattern localization, etc. in the interference measurement method can be avoided, and highly precise three-dimensional measurement is achieved even for an object of large depth or an object of complicated shape having discontinuous surfaces.

Moreover, according to the three-dimensional shape measurement device of the present invention, a highly precise three-dimensional shape measurement can be realized by the above mentioned three-dimensional shape measurement method.

BRIEF DESCRIPTION OF THE DRAWINGS

FIG. 1 is a flow chart of a three-dimensional shape measurement method according to an embodiment of the present invention.

FIG. 2 is a plan view of an optical system used for carrying out the measurement method.

MODE FOR CARRYING OUT THE INVENTION

Figure 3:
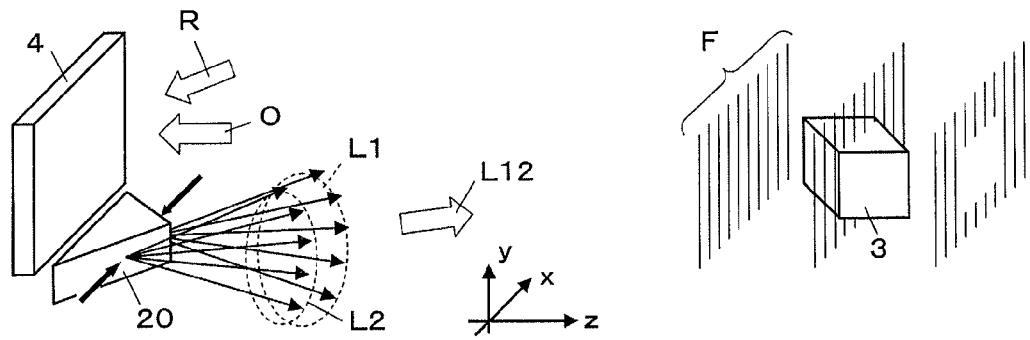
FIG. 3 is a perspective diagram of the optical system showing a situation of interference fringe pattern projection and hologram acquisition by the measurement method.

Hereafter, a method for measuring a three-dimensional shape and a device for measuring a three-dimensional shape (hereafter called as the measurement method or the measurement device, etc.) of the present invention are described with reference to drawings. FIGS. 1 to 12 show the measurement method and device according to an embodiment of the present invention. As shown in a flow chart of FIG. 1, the measurement method of the present invention is a method for measuring a three-dimensional shape of an object surface using a digital hologram in which an interference fringe pattern F projected onto the object surface is recorded, and comprises a projection step (S1), a recording step (S2), and a measurement step (S3). In the projection step (S1), the interference fringe pattern F, which has a single spatial frequency fi generated by interference between two illumination lights L1 and L2, is projected onto the object. In the recording step (S2), an object light O which is a scattered light of the interference fringe pattern F is recorded as an off-axis hologram $I_{OR}$ with a photo detector using an off-axis reference light R. In the measurement step (S3), a plurality of reconstructed images having different focal distances are generated based on the off-axis hologram $I_{OR}$ recorded in the recording step (S2), the component of the single spatial frequency corresponding to the interference fringe pattern F is extracted from the reconstructed image, and the distance to the object surface is determined by a focusing method. The projection step (S1) and the recording step (S2) are carried out using an optical system shown in FIG. 2, for example, and the measurement step (S3) is carried out by computation. The measurement method comprises a measurement method using a focusing method, which can take advantage of reconstructing a free-focus image with holography, combined with an extracting processing of the single spatial frequency component for avoiding the influence of speckles. Below, the projection step (S1) and the recording step (S2) will be described in detail with FIGS. 2 to 8, and after that, the measurement step (S3) will be described in detail with FIGS. 9 to 12.

(Optical System)

As shown in FIG. 2, the optical system 10 used for the measurement method comprises a laser 2 which is a monochromatic coherent light source, groups of optical elements including a lens 21 which form the laser beam from the laser 2 into illumination lights L1 and L2 and a reference light R and emits them, a photo detector 4 (image sensor), and a computer 5 which controls the laser 2 and the photo detector 4. The photo detector 4 is arranged facing its light receiving surface in a direction of a coordinate axis z shown in the figure. An object 3 is arranged as a target for three-dimensional shape measurement ahead in a z-direction (in an image pick-up axis) of the center of the photo detector 4. Moreover, the xy-directions of a rectangular coordinate system-xyz are defined along with each edge of the rectangular photo detector 4. Moreover, although the x-direction and the z-direction are illustrated as horizontal, the optical system 10 generally can be used with an arbitrary posture.

A group of optical elements for the illumination light L1 is equipped and constituted with lenses 21 and 22, a beam splitter BS1, a mirror M1, a beam splitter BS2, a mirror M2, a lens 23, and a prism 20 along an optical path from the laser 2. A group of optical elements for the illumination light L2 is equipped and constituted with a mirror M3, a lens 24, and the prism 20 along another optical path branched by the beam splitter BS2. The lenses 21 and 22 enlarge the diameter of the laser beam to make a parallel beam. The beam splitter BS1 splits a laser beam for the illumination lights L1 and L2 and the reference light R. The beam splitter BS2 splits the laser beam into two illumination lights L1 and L2. Each of the lenses 23 and 24 makes a parallel beam into a spherical wave light. The prism 20 is arranged in the downward position (refer to FIG. 3) out of the visual field of the photo detector 4, directing its vertex to the object direction (direction of projection), reflects lights coming from the lenses 23 and 24 with reflective surfaces sandwiching the vertex, and projects them as the illumination lights L1 and L2 to the object 3. A group of optical elements for the reference light R is equipped and constituted with a mirrors M4 and M5, and a lens 25 along another optical path branched by the beam splitter BS1. The lens 25 makes a parallel beam into a spherical wave light and projects it towards the light receiving surface of the photo detector 4.

(Projection Step S1)

Figure 4:
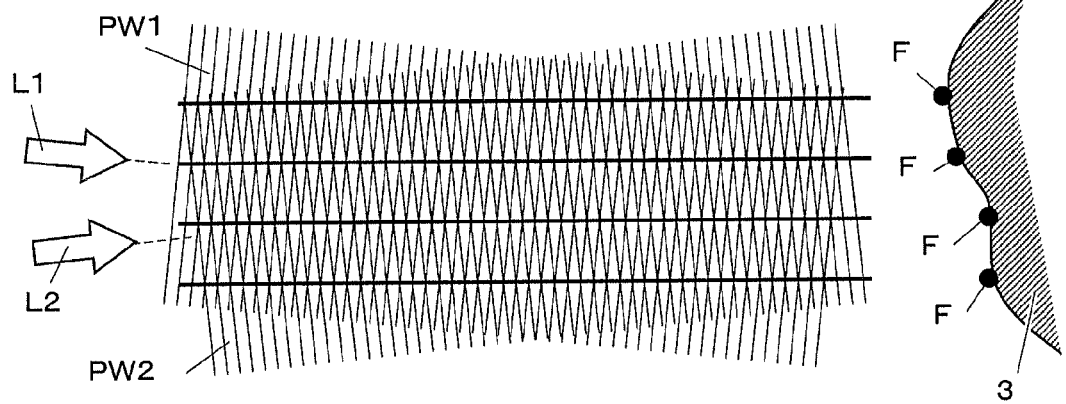
FIG. 4 is a plan view explaining constitution of an interference fringe pattern used for carrying out the measurement method.

As shown in FIGS. 2 and 3, the spherical wave illumination lights L1 and L2 overlap mutually, become an illumination light L12, and illuminates the object 3. The illumination lights L1 and L2 can be regarded as plane waves PW1 and PW2 in a distant place far enough from the center of the spherical wave. As shown in FIG. 4, when two plane waves PW1 and PW2 overlapped and interfered, an interference pattern uniformly distributed in three-dimensional space appears. This interference pattern serves as an interference fringe pattern F which has single spatial frequency (referred to as fi) in a plane which intersects perpendicularly with a synthetic wave vector (referred to as k12) of two wave vectors (referred to as k1 and k2) of the plane waves PW1 and PW2, for example. Moreover, when the illumination light L12 of such an interference pattern is projected onto an object and a diffused light on the object surface is observed from a direction of the synthetic wave vector k12, the interference fringe pattern F which light-and-shade changes uniformly in one direction is observed irrespective of positions on the object surface. In the constitution of the optical system 10 in FIGS. 2 and 3, an interference fringe pattern F, in which y-direction light-and-shade patterns (vertical fringes) are repeated with a single spatial frequency fi in x-direction (crosswise direction) seeing from the photo detector 4, is observed.

Here, "an interference fringe pattern F" and "an illumination light L12 having an interference pattern which causes the interference fringe pattern F on the an object surface" are equated, and further it is supposed that "projecting an interference fringe pattern F on an object surface" means "causing an interference fringe pattern F on an object surface by projecting an illumination light L12 on an object". Under these premises, the projection step (S1) is a step in which an interference fringe pattern F to be projected onto an object surface is formed by the interference between two mutually coherent laser beams, i.e., spherical wave illumination lights L1 and L2, and the interference fringe pattern F is projected onto the object surface so that an arrangement of the interference fringe pattern F seen from the light receiving surface of the photo detector 4 may be fixed irrespective of positions of the object surface. In other words, the interference fringe pattern F picked-up with the photo detector 4 becomes a striped pattern of regular interval without curve depending on the object shape. In the optical system 10, an image pick-up axis of the photo detector 4 and the wave vector k12 of the illumination light L12 are arranged and contained in the same plane so that such a projection step (S1) can be executed. In addition, the prism 20 can also be arranged above, instead of bellow, the photo detector 4 shown in FIG. 3. Moreover, the prism 20 can also be arranged on the side, i.e., left or right of the photo detector 4 after 90 degrees rotation around the axis of the vertex direction, or can also be arranged at the surrounding other arbitrary position of the photo detectors 4. In the horizontal arrangement, the direction of the interference fringe pattern F becomes horizontal, and, in the diagonal position arrangement, the direction of the interference fringe pattern F becomes inclined.

Moreover, the spherical wave illumination lights L1 and L2 which are laser beams from the laser 2 of a monochromatic coherent light source usually have sinusoidal light intensity, therefore the interference fringe pattern F made by interference of these lights has sinusoidal light intensity. By using such an interference fringe pattern F, spatial frequencies of the interference fringe pattern F can be made into a single spatial frequency fi of high purity. The numerical value of this frequency fi can be set up by adjusting an intersecting angle between the wave vectors k1 and k2 of the illumination lights L1 and L2. Here, the setting of the single spatial frequency fi is described further. It is supposed that point light sources are at the centers of the spherical wave illumination lights L1 and L2, respectively, and the light receiving surface of the photo detector 4 is arranged perpendicular to the z-direction (position gap in the z-direction in FIGS. 2 and 4 is ignored). Furthermore, following notations are used: a distance T between the point sources; a width D of the photo detector 4 in the x-direction; and a wave length λ of the light from the laser 2. Then, a resolving power 6 in the xy-directions for a reconstructed image on a plane at distance z far enough from the point sources (namely, T<<z) becomes $\delta=(z/D)\lambda$. Moreover, a fringe interval $\alpha$ in the interference fringe pattern F becomes $\alpha=(z/T)\lambda$, and this fringe interval $\alpha$ can be adjusted easily by changing the distance T between the point sources. Moreover, when the interference fringe pattern F is used for a shape measurement by being recorded and reconstructed, it is necessary to fill a condition $\delta<\alpha$ or $(z/D)\lambda<(z/T)\lambda$ as a condition that each stripe in the interference fringe pattern F can be identified and recognized. Therefore, it is necessary to fill a condition D>T. That is, the distance T between the point sources should be set smaller than the width D of the photo detector 4.

Moreover, in order to use effectively the interference fringe pattern F projected onto the object surface, the interference fringe pattern F needs to be observed as an interference fringe pattern of light-and-shade, and needs to be recorded, appropriately. If the light-and-shade change of the interference fringe pattern F was weak, the projected interference fringe pattern F could not be recorded and reconstructed well. When a light reflecting object like metal or glass, or a light penetrating and diffusing object like plastic or living body, for example, is a target object for the three-dimensional shape measurement, it is required such a treatment that the scattered light scattered on the object surface is intensified. To such an object, what is necessary is just to apply powder of high refractive index and low light absorption rate such as titanium oxide to the object surface, in order to scatter the illumination light on the object surface. If the illumination light were more effectively scattered by such a roughening treatment for the reflection surface, it would become possible to record a hologram of the interference fringe pattern F having spatial frequencies in the higher frequency side. A treatment like this powder application is unnecessary for an object whose surface is appropriately rough enough to observe the interference fringe pattern F appropriately.

Anyway, the measurement method uses reconstructed images of an interference fringe pattern F projected on an object surface of rough surface. When an object surface of rough surface is irradiated with a coherent laser beam, speckles occur inevitably due to roughness of the object surface. The speckle is a light-and-shade pattern generated by random change of light intensity caused by mutual interference between lights scattered by the object surface, and it has a wide spatial frequency band width. In the three-dimensional shape measurement of a rough surface object using holography, if the influence of the speckles were not reduced, an accuracy of measurement would fall remarkably.

Figure 5A:
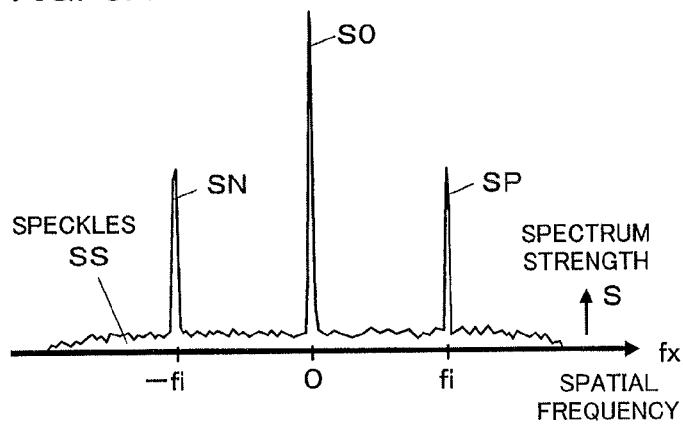
FIG. 5A is a figure of frequency distribution showing an example of a spatial frequency spectrum of an interference fringe pattern image recorded on a hologram by the measurement method.
Figure 5B:
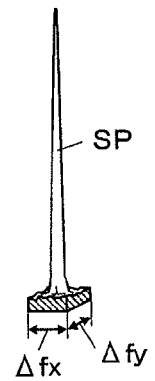
FIG. 5B is a three-dimensionally displayed figure of frequency distribution of a single frequency portion extracted from FIG. 5A.

FIG. 5A shows a spatial frequency distribution obtained from an image reconstructed from a hologram in which an interference fringe pattern F having a single spatial frequency fi is recorded. This figure shows the spatial frequency distribution in the reconstructed image, in the case that the interference fringe pattern F was projected on a uniform diffusing surface, where stripes of the interference fringe pattern F in y-axis direction were located in a line with x-axis direction with a regular interval, namely, with a single spatial frequency fi, as shown in FIG. 3. This distribution figure is equivalent to a figure in the case fx=fi and fy=0 for spatial frequencies (fx, fy) along the xy-direction in a general reconstructed image. As shown in this figure, the reconstructed image is an image in which following components are overlapped: two alternating-current components SP and SN of spatial frequencies fi and −fi resulting from the interference fringe pattern F itself; one direct-current component S0 of frequency 0; and speckles SS having a wide frequency band resulting from mutual interference among scattered lights. Thus, as shown in FIG. 5B, by performing processing mentioned later to the reconstructed image of the interference fringe pattern F recorded in the hologram, only the alternating current component SP of the spatial frequency fi can be extracted in a narrow range of $(\Delta fx, \Delta y)$ (specifically, for example, only a peak value), and the influence of the spectral component of the speckles spreading widely with low strength can be reduced or eliminated. In order for such filtering processing to generate an effect, it is effective to use the interference fringe pattern F which has sinusoidal light intensity distribution and a single spatial frequency fi. That is, an interference fringe pattern of a single spatial frequency having sinusoidal light intensity distribution as image information given to an object surface is projected onto the object surface, and only the component of the same spatial frequency as that of the interference fringe pattern is extracted from a reconstructed image. By this method, only the image information given to the object surface can be extracted from the reconstructed image in the state that the influence of the speckles is eliminated.

In the above, it was described that spherical wave lights are used as the illumination lights L1 and L2, however, what is necessary is just to project a desired interference fringe pattern F on an object surface, and the illumination lights L1 and L2 may be plane waves, respectively. Moreover, it was described that a laser beam using the laser 2 as a light source is split and used as the illumination lights L1 and L2, however, a light source independent of the laser 2 may be used as a light source for the illumination lights L1 and for L2. In this case, the wave length of the illumination lights can be set arbitrarily and independently of the wave length $\lambda$ of the laser beam from the laser 2. Moreover, upon dropping the accuracy of measurement and performing a simple shape measurement, the interference fringe pattern F may consist of slit lights, etc. instead of an interference fringe pattern. Moreover, as for the light intensity distribution of the interference fringe pattern F, when the light intensity distribution is more sinusoidal, finer spatial frequency distribution is achieved, and it is possible to raise the accuracy of measurement more, but it does not necessarily need to be a strictly sinusoidal light intensity distribution.

(Recording Step S2)

Returning to FIG. 2, the recording step is described. As shown in FIG. 2, the reference light R is projected towards the center of the light receiving surface of the photo detector 4 along a direction leaning to the image pick-up axis, i.e., an off-axis direction. An object light O based on the interference fringe pattern F projected onto the surface of the object 3 enters on the light receiving surface of the photo detector 4. The object light O is a scattered light from the rough surface of the object 3. From the light receiving surface of the photo detector 4, the interference fringe pattern F of the pinstripes regularly located in a line with the x-direction can be seen together with the object 3. The optical system 10 records an interference image of the object light O and the reference light R with the photo detector 4 as an off-axis hologram $I_{OR}$ which is a digital hologram. What is necessary is just to record one sheet of the off-axis hologram $I_{OR}$ to one posture of the object 3 which is a target for shape measurement in the recording step (S2) of the measurement method. Even for an moving object, what is necessary is just to record one sheet of the off-axis hologram $I_{OR}$ to every one posture needed under movement. In other words, by this measurement method, what is necessary is to be able to obtain only one sheet hologram among several and mutually different phase state off-axis holograms which are required for one objective posture in what is called phase shift digital holography. The optical system 10 for performing such a single shot record can be constituted easily.

Figure 6:
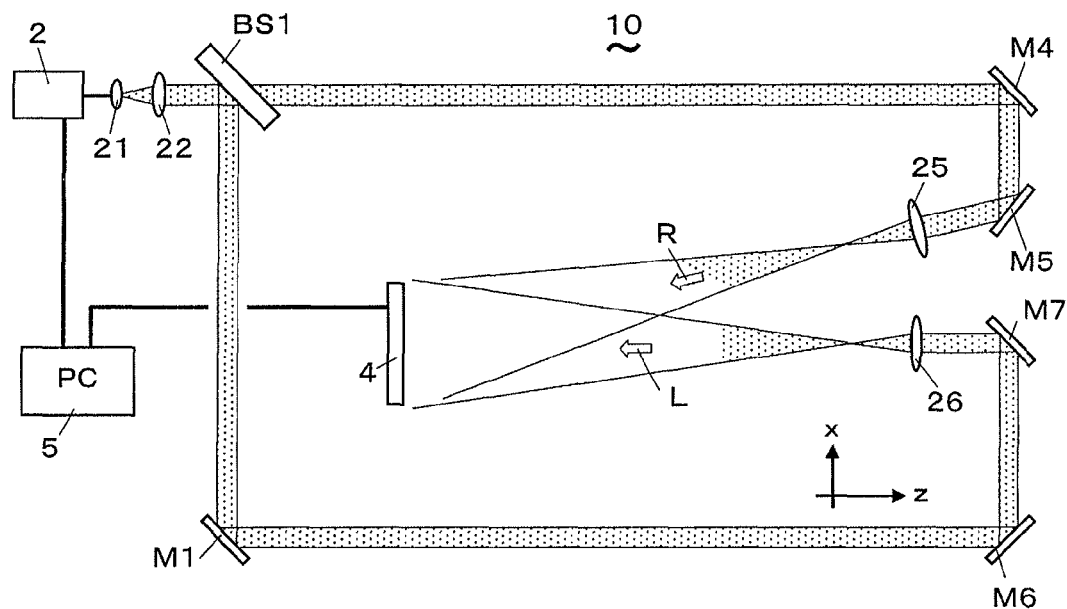
FIG. 6 is a plan view of the optical system showing a situation for acquiring a hologram of reference light.

Next, acquisition of the data of the reference light R is described with reference to FIG. 6. In order to change the off-axis hologram $I_{OR}$ into an in-line hologram in the measurement step mentioned later, the data of the reference light R is required. As shown in FIG. 6, the group of optical elements for projecting the reference light R and the arrangement of the photo detector 4 are kept in a state that the off-axis hologram $I_{OR}$ was recorded, and a group of optical elements for projecting an in-line reference light L for reconstruction onto the photo detector 4 is set separately. The in-line reference light L for reconstruction is a light for recording information on the reference light R as a hologram. The group of optical elements for the reference light L is equipped and constituted with mirrors M1, M6 and M7, and a lens 26 along an optical path branched by the beam splitter BS1. The lens 26 changes the reference light L into a spherical wave, and projects the spherical wave onto the photo detector 4. The optical system 10 records an interference image of the reference light R and the in-line reference light L for reconstruction with the photo detector 4 as an off-axis hologram $I_{LR}$ which is a digital hologram. Thereby, the phase difference between the off-line reference light R and the in-line reference light L for reconstruction can be recorded as a hologram. As to the in-line reference light L for reconstruction, its wave length λ is equal to the wave length λ of the reference light R, and its optical axis should usually be set in the front direction of the center of the photo detector 4. As to the off-axis hologram $I_{LR}$, one time recording is enough as long as there is no change in the conditions of the reference light R projected onto the photo detector 4. That is, the off-axis hologram $I_{LR}$ can be common to the off-axis holograms $I_{OR}$ recorded about each posture of the object 3 and other objects which differ from the object 3 under certain conditions. Since the recording step in the measurement method records the object light O as an off-axis hologram without passing through any imaging lens by a single shot, a distortionless image of the interference fringe pattern F can be recorded, and a reconstructed image becomes a distortionless image.

Figure 7:
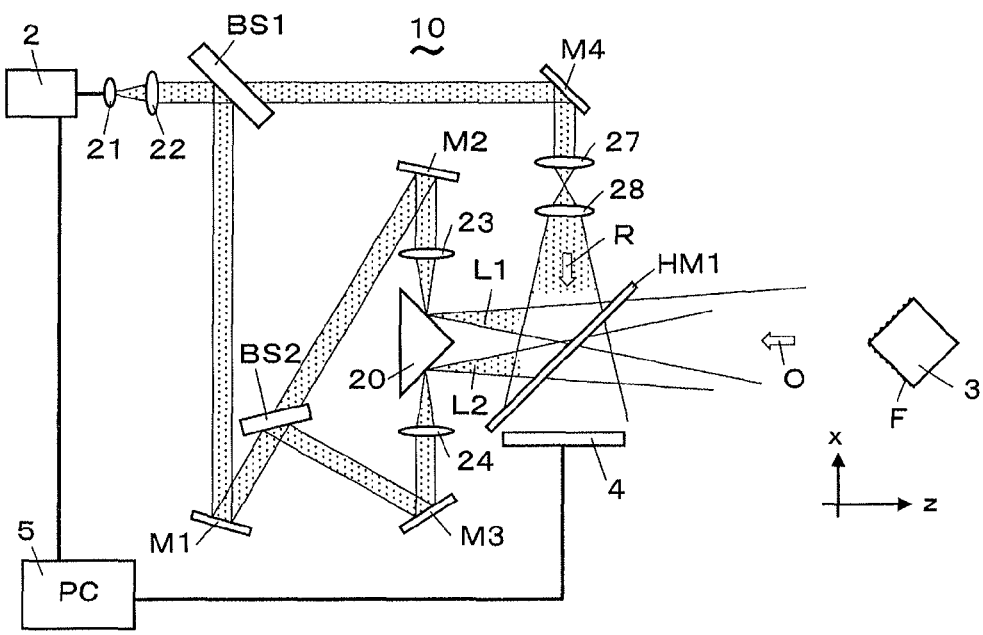
FIG. 7 is a plan view showing another example of an optical system.
Figure 8:
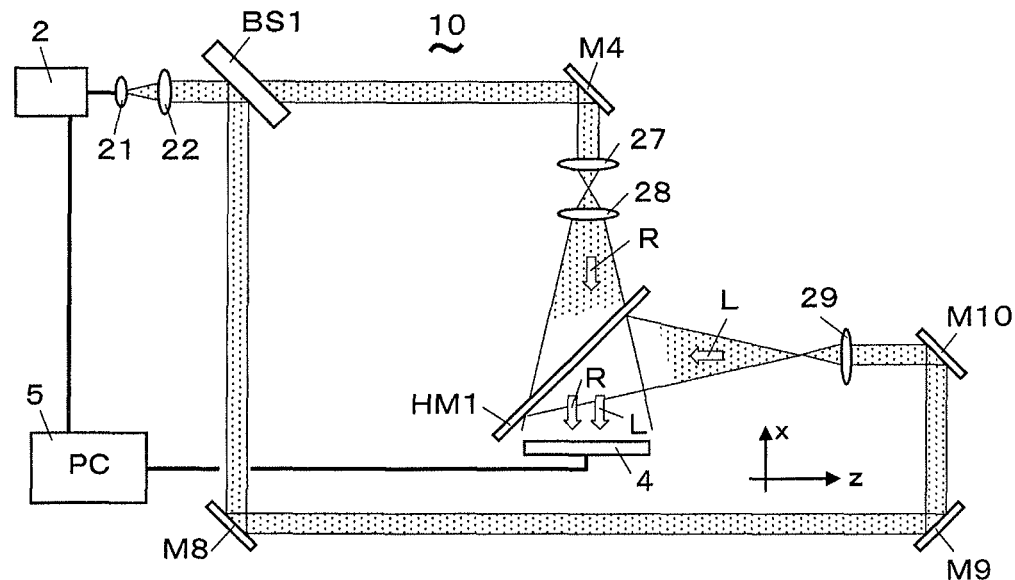
FIG. 8 is a plan view of the optical system showing a situation for acquiring a hologram of reference light.

FIGS. 7 and 8 show other examples of constitution of the optical system 10. The optical system 10 shown in FIG. 7 is a system in which a group of optical elements for the reference light R is arranged more compactly than the optical system shown in above-mentioned FIG. 2. The group of optical elements for the reference light R is equipped and constituted with a mirror M4, lenses 27 and 28 along an optical path branched by the beam splitter BS1. The lenses 27 and 28 enlarge the diameter of the reference light R in a shorter distance compared with the case of FIG. 2. In order to make such constitution, the photo detector 4 is rotated and moved: so that its direction of the light receiving surface is rotated 90 degrees around y-axis (not shown), and also it is moved to the side of the prism 20 (the light receiving axis is x-direction). Moreover, a half mirror HM1 is newly introduced to make the object light O bend 90 degrees and enter the photo detector 4 of modified layout. The illumination lights L1 and L2 from the prism 20 do not enter the half mirror HM1, since the prism 20 is arranged in the position avoiding the front of the photo detector 4. In this optical system 10, an important thing is that the interference fringe pattern F can be seen at fixed position from the photo detector 4 without distortion irrespective of the surface shape of the object 3.

The optical system 10 shown in FIG. 8 is a system for projecting an in-line reference light L for reconstruction to acquire the information on the reference light R. A group of optical elements for the reference light L is equipped and constituted with mirrors M8, M9 and M10, and a lens 29 along an optical path branched by the beam splitter BS1. The reference light L is projected through the lens 29 from the same direction as that of the above-mentioned object light O, reflected by the half mirror HM1, and enters onto the photo detector 4 from the front direction. Thereby, the information on the reference light R is recorded as an off-axis hologram $I_{LR}$. Also in this case, one time recording is enough for the recording of the off-axis hologram $I_{LR}$ as long as the projection condition of the reference light R is held at fixed conditions. Therefore, the spread of the spatial arrangement of the group of optical elements for reference light L is permissible.

(Measurement Step S3)

Figure 9:
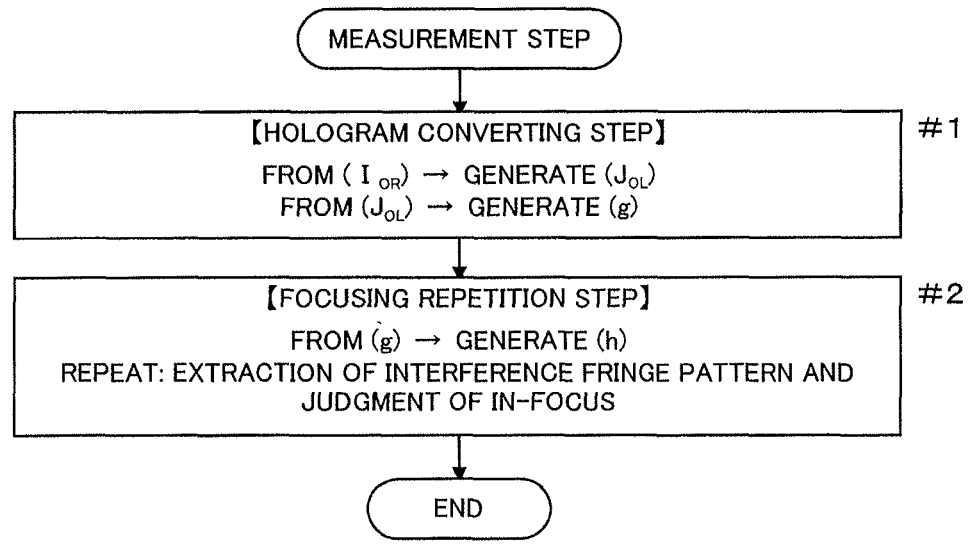
FIG. 9 is a flow chart of a measurement step in the measurement method.

Next, the measurement step is described with reference to FIGS. 9 to 12. As shown in FIG. 9, the measurement step is a step for performing a hologram converting step (#1) and a focusing repetition step (#2) in order, and performing a three-dimensional shape measurement for an object. The first hologram converting step (#1) is a step for generating an object light complex amplitude in-line hologram g, which expresses an object light wave-front at z=0, from an off-axis hologram $I_{OR}$ recorded in the recording step. This step is a step for preparing the hologram g which is a target of the focusing method, and is a head end process in the measurement step. The next focusing repetition step (#2) is a step for performing the shape measurement substantially by obtaining in-focus points by applying the focusing method for every measurement point of the hologram g of one sheet showing the whole image. In other words, the hologram converting step (#1) is a step for reconstructing the projected interference fringe pattern, which is recorded as an exact complex amplitude in-line hologram using the single shot digital holography, as a distortionless image from the complex amplitude in-line hologram through numerical calculation. Moreover, the focusing repetition step (#2) is a step for extracting the component of the same spatial frequency as that of the projected interference fringe pattern from the reconstructed image, and for specifying the distance from a hologram recording plane to the measurement point on the object surface by applying the focusing method to the extracted component, and a plurality of kinds of processing methods can be used. Hereafter, detailed description of these steps is made in order.

(Hologram Converting Step #1)

Figure 10:
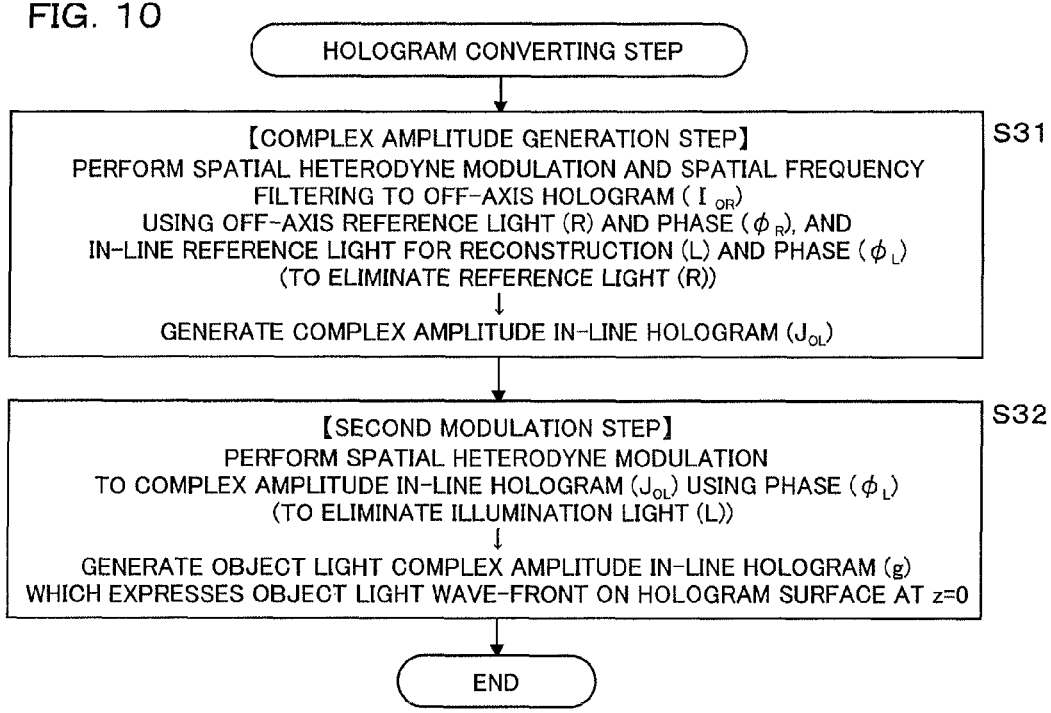
FIG. 10 is a flow chart of a hologram converting step in the measurement step.

As shown in FIG. 10, in the hologram converting step, a complex amplitude generation step (S31) and a second modulation step (S32) are performed in order, and a complex amplitude hologram $J_{OL}$ is generated by converting the off-axis hologram $I_{OR}$, and the hologram g to become the target of the focusing method is generated from the complex amplitude hologram $J_{OL}$.

(Complex Amplitude Generation Step S31)

Here, the image recording is described using mathematical expressions. In the hologram image recording, a illumination light, a reference light, an object light, etc. participate. Then, using a position coordinate system (x, y) and a time variable t on the surface of the photo detector 4, an object light O(x, y, t), an off-axis reference light R(x, y, t), an in-line reference light L(x, y, t) for reconstruction, etc. are denoted in a general form by following equations (1), (2) and (3), respectively. Such lights are the mutually coherent lights of an angular frequency ω. The coefficients, the arguments, the subscripts, etc. in each equation are recognized to be those in a general expression and meaning. Moreover, in each following equation, an explicit note of the coordinate (x, y), etc. are omitted appropriately.

$$O(x,y,t) = O_0(x,y)\exp[i(\phi_O(x,y) - \omega t)] \quad (1)$$

$$R(x,y,t) = R_0(x,y)\exp[i(\phi_R(x,y) - \omega t)] \quad (2)$$

$$L(x,y,t) = L_0(x,y)\exp[i(\phi_L(x,y) - \omega t)] \quad (3)$$

Light intensity $I_{OR}(x, y)$ of a composed light made of the object light O and the off-axis reference light R of above equations, and light intensity $I_{LR}(x, y)$ of a composed light made of the in-line reference light L for reconstruction and the off-axis reference light R of above equations are denoted by following equations (4) and (5), respectively. These are recorded as the off-axis hologram $I_{OR}$ and the off-axis hologram $I_{LR}$ using the photo detector 4, respectively.

$$I_{OR}(x,y) = O_0^2 + R_0^2 + O_0 R_0 \exp[i(\phi_O - \phi_R)] + O_0 R_0 \exp[-i(\phi_O - \phi_R)] \quad (4)$$

$$I_{LR}(x,y) = L_0^2 + R_0^2 + L_0 R_0 \exp[i(\phi_L - \phi_R)] + L_0 R_0 \exp[-i(\phi_L - \phi_R)] \quad (5)$$

In above equations (4) and (5), the 1st term of the right hand side is the light intensity component of the object light O or the in-line reference light L for reconstruction, and the 2nd term is the light intensity component of the off-axis reference light R. Moreover, the 3rd term and the 4th term of each equation denotes a direct image component and a conjugate image component, respectively, which are made as the results that the object light O or the in-line reference light L for reconstruction is modulated by the off-axis reference light R.

When only the 3rd terms of equations (4) and (5) are extracted using spatial frequency filtering, a complex amplitude hologram $J_{OR}$ in which the object light is recorded and a complex amplitude hologram $J_{LR}$ in which the in-line reference light L for reconstruction is recorded are obtained as shown in following equations (6) and (7), respectively.

$$J_{OR}(x,y) = O_0(x,y) R_0(x,y) \exp[i(\phi_O(x,y) - \phi_R(x,y))] \quad (6)$$

$$J_{LR}(x,y) = L_0(x,y) R_0(x,y) \exp[i(\phi_L(x,y) - \phi_R(x,y))] \quad (7)$$

Above-mentioned spatial frequency filtering is performed using Fourier-transform which changes each of equations (4) and (5) into a spatial frequency space expression, filtering by a band pass filter, and using subsequent inverse Fourier-transform. When a spherical wave is used as the off-axis reference light R, in a frequency space, it becomes easy to separate the direct image component from the light intensity component and the conjugate image component, but even if the reference light R is not a spherical wave, the direct image component is separable. In addition, supposing a two-dimensional array of pixels (picture elements) in the photo detector 4 is of a pixel interval (pitch) p, the recordable highest spatial frequency band width of a hologram which is recordable using the photo detector 4 becomes fs=1/p.

When equation (6) is divided by equation (7), the amplitude Ro and the phase-angle $\phi_R$ of the off-axis reference light R can be eliminated from equation (6), and a complex amplitude in-line hologram $J_{OL}$ according to the in-line reference light L for reconstruction is obtained as following equation (8). This division process is a process of spatial heterodyne modulation, and is a process for eliminating the reference light R component from the complex amplitude off-axis hologram $J_{OR}$ (both of intensity and phase).

$$J_{OL}(x,y) = (O_0(x,y)/L_0(x,y))\exp[i(\phi_O(x,y) - \phi_L(x,y))] \quad (8)$$

As can be seen from above, by obtaining the complex amplitude hologram $J_{LR}$ in advance from one sheet of the off-axis hologram $I_{LR}$ in which the off-axis reference light R is recorded using the in-line reference light L for reconstruction, the complex amplitude in-line hologram $J_{OL}$ necessary for image reconstruction can be obtained from one sheet of the off-axis hologram $I_{OR}$.

(Modification of the Complex Amplitude Generation Step)

Figure 11A:
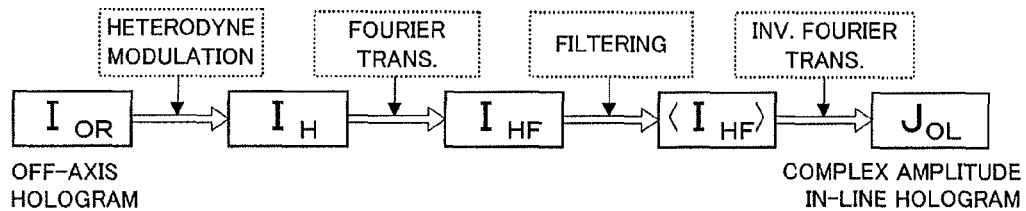
FIG. 11A is a block diagram showing another embodiment of the hologram converting step in the measurement step.
Figure 11B:
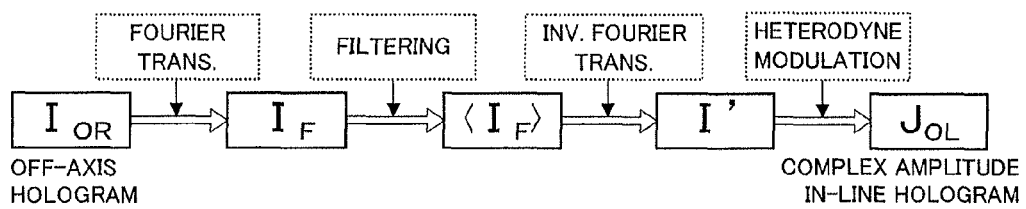
FIG. 11B is a block diagram showing a modification of FIG. 11A.

Next, with reference to FIGS. 11A and 11B, another example for obtaining the complex amplitude hologram $J_{LR}$ is described. When the light intensity $I_{OR}(x, y)$ of above equation (4) is electronically recorded as an off-axis hologram $I_{OR}$, the direct image component of the 3rd term and the conjugate image component of the 4th term are separated, and each of these components is recorded in a spatial frequency band which is different from that of the other component. Here, it is supposed that a three-dimensional image is recorded as an off-axis hologram $I_{OR}$ in a manner that the direct image component and the conjugate image component does not overlap with the component of the light intensity $O_0^2$ of the object light in the two-dimensional spatial frequency domain.

As shown in FIG. 11A, an in-line hologram $I_H$ for the reference light L is obtained by performing spatial heterodyne modulation to the off-axis hologram $I_{OR}$. The spatial heterodyne modulation is performed by multiplying the both sides of equation (4) by a factor $\exp[i(\phi_R - \phi_L)]$ which has a difference $(\phi_R - \phi_L)$ of each phase of the reference lights R and L. Thus, an in-line hologram $I_H$ shown in following equation (5) is obtained.

$$I_H = I_{OR} \times \exp[i(\phi_R - \phi_L)] \quad (9)$$
$$= (O_0^2 + R_0^2)\exp[i(\phi_R - \phi_L)] + O_0 R_0 \exp[i(\phi_O - \phi_L)] + O_0 R_0 \exp[-i(\phi_O - 2\phi_R + \phi_L)]$$

By the above-mentioned spatial heterodyne modulation, the 2nd term and the 3rd term of the right hand side of equation (9) are obtained from the optical modulation interference fringe pattern of the 3rd term and the 4th term of the right hand side of equation (4), respectively. A direct image is reconstructed from the 2nd term of the right hand side of equation (9), and a conjugate image is reconstructed from the 3rd term of the right hand side of equation (9). Therefore spatial frequency filtering is performed to equation (9), and only the 2nd term is taken out separately, in which the direct image is recorded. And exact complex amplitude in-line hologram $J_{OL}$ for image reconstruction is obtained. Furthermore, the 1st term and the 3rd term of the right hand side of equation (9) contain both phases $\phi_R$ and $\phi_L$ of the reference light R and the reference light L, whereas the 2nd term contains only the phase $\phi_L$ of the reference light L. In other words, the 2nd term of the right hand side of equation (9) consists only of the in-line component, and the 1st and 3rd terms of the right hand side contain the off-axis component.

Above-mentioned converting processing is performed as shown in FIG. 11A: by performing fast Fourier transform (FFT) to the hologram $I_H$ to obtain a hologram $I_{HF}$ from it; by doing a filtering process on the hologram $I_{HF}$ to obtain a hologram $\langle I_{HF} \rangle$ from it with a window which leaves the center section in the spatial frequency distribution; and by performing fast Fourier transform (inverse transform) again on the hologram $\langle I_{HF} \rangle$, and then a final complex amplitude in-line hologram $J_{OL}$ is generated.

In addition, as shown in FIG. 11B, the same result is obtained by performing the spatial frequency filtering first, and after that, by performing the spatial heterodyne modulation. In full expressions, the holograms $I_F$, $\langle I_F \rangle$, and I' are obtained by performing the Fourier transform, filtering, and inverse Fourier transform to the off-axis hologram $I_{OR}$, respectively, and the final complex amplitude hologram $J_{OL}$ of one component is obtained by the subsequent spatial heterodyne modulation H.

(The Second Modulation Step S32)

In order to reconstruct an exact light wave-front from the complex amplitude in-line hologram $J_{OL}$ obtained by the above-mentioned step, the object light is expanded using plane waves which are exact solutions of Helmholtz equation. Then, firstly, spatial heterodyne modulation using the phase $\phi_L(x, y)$ of the in-line reference light L for reconstruction is performed to the complex amplitude in-line hologram $J_{OL}$. This modulation is called as the second modulation. The spatial heterodyne modulation using the phase $\phi_L(x, y)$ are carried out by, for example, multiplying the complex amplitude in-line hologram $J_{OL}$ shown in equation (8) by $\exp(i\phi_L(x, y))$. An object light complex amplitude in-line hologram $g(x, y)$ shown in following equation (10) is obtained as the result of the spatial heterodyne modulation. This object light complex amplitude in-line hologram $g(x, y)$ expresses an object light wave-front at the light receiving surface of the photo detector 4, i.e., the object light wave-front at z=0 when the z-coordinate axis is set in a direction normal to the light receiving surface and the position of the light receiving surface is set as z=0.

$$g(x,y) = (O_0(x,y)/L_0(x,y))\exp(i\phi_O(x,y)) \quad (10)$$

The above is the explanation on the hologram converting step (#1). The hologram g, which is a target for the focusing method, is generated from the off-axis hologram $I_{OR}$ by this hologram converting step. Once again it is noted that the hologram converting step (#1) in the measurement step (S3) comprises the complex amplitude production step (S31) and the second modulation step (S32). And the complex amplitude generation step (S31) comprises a modulation step for performing the spatial heterodyne modulation to a hologram based on the phase-angle $\phi_L$ of the in-line reference light L for reconstruction and the phase-angle $\phi_R$ of the off-axis reference light R, and a filtering step for performing spatial frequency filtering to eliminate the conjugate image component from the hologram, and generates the complex amplitude in-line hologram $J_{OL}$ from the off-axis hologram $I_{OR}$ by performing these modulation step and filtering step in this order or inverse order to the off-axis hologram $I_{OR}$ recorded by the recording step (S2).

Moreover, the second modulation step (S32) eliminates the in-line reference light L component for reconstruction from the complex amplitude in-line hologram $J_{OL}$ generated by the complex amplitude production step (S31) by performing the spatial heterodyne modulation using the phase $\phi_L$ of the in-line reference light L for reconstruction to the complex amplitude in-line hologram $J_{OL}$ so as to generate the object light complex amplitude in-line hologram g, which expresses the object light wave-front on the hologram plane defined with the light receiving surface of the photo detector.

(Focusing Repetition Step #2)

Figure 12:
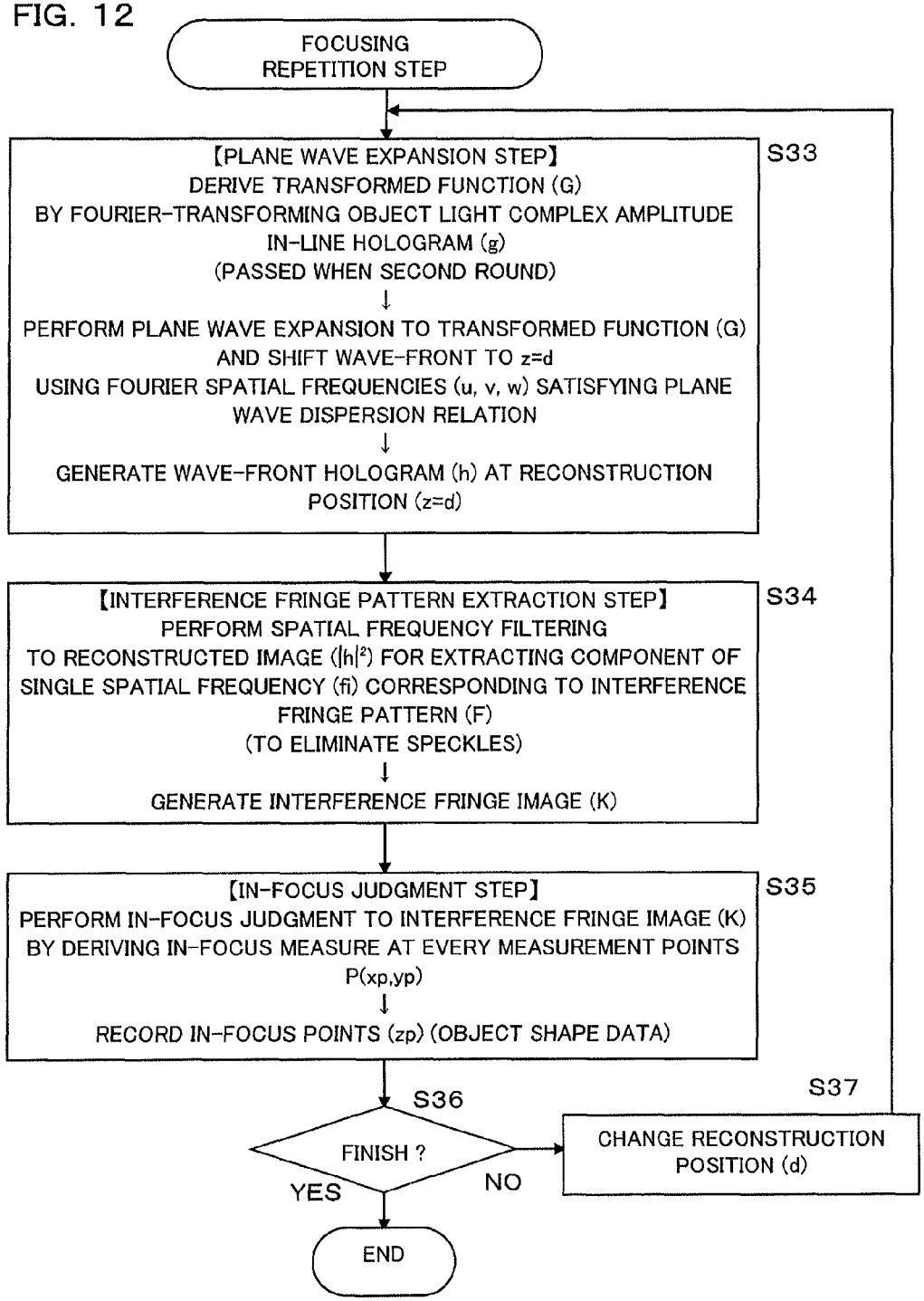
FIG. 12 is a flow chart of a focusing repetition step in the measurement step.

As shown in FIG. 12, the focusing repetition step comprises a plane wave expansion step (S33), an interference fringe pattern extraction step (S34), an in-focus judgment step (S35), and a reconstruction position change step (S37), and obtains the object shape recorded in the object light complex amplitude in-line hologram g.

(Plane Wave Expansion Step S33)

The plane wave expansion obtains a transformed function G as the result of Fourier-transform of the object light complex amplitude in-line hologram $g(x, y)$, and generates a wave-front hologram (h) in a predetermined focal position by performing a plane wave expansion to the transformed function G using Fourier spatial frequencies (u, v, w) satisfying the dispersion relation of a plane wave. Plane waves are exact solutions of Helmholtz equation for electromagnetic waves. An accurate light wave-front can be reconstructed by expanding the hologram recording the object light O using plane waves which are exact solutions. Thus, first, $g(x, y)$ of above equation (10) is Fourier-transformed, and the transformed function G at z=0 is obtained as following equation (11).

$$G(u,v) = \iint g(x,y)\exp[-i2\pi(ux+vy)]dxdy \quad (11)$$

Next, a wave-front $h(x, y, d)$ on a x-y plane at z=d, as following equation (12), is obtained by performing the plane wave expansion to the transformed function G using Fourier spatial frequencies (u, v, w) satisfying the dispersion relation of a plane wave. Moreover, d can be not only a plus value but also any value. In addition, u and v in (u, v, w) are the Fourier spatial frequencies in the x and y-direction, respectively. Moreover, as shown following equation (13), the Fourier spatial frequency w in the z-direction can be obtained from the dispersion relation of a plane wave as a function of u and v containing a wave length λ as a parameter.

$$h(x,y) = \iint G(u,v)\exp[i2\pi w(u,v)d]\exp[i2\pi(ux+vy)]dudv \quad (2)$$

$$w(u,v) = \sqrt{1/\lambda^2 - u^2 - v^2} \quad (13)$$

The wave-front hologram $h(x, y)$ at arbitrary distance z=d can be obtained by equation (12), and light intensity of a reconstructed light can be calculated with $|h(x,y)|^2$. The wave-front hologram $h(x, y)$ is an exact solution of Helmholtz equation, and satisfies a boundary condition $g(x, y)$ in the light receiving surface (hologram plane) of the photo detector 4. A distortionless high-resolution image obtained using the plane wave expansion can be seen by displaying the wave-front hologram $h(x, y)$ on an electronic display with intensity of light for every pixel obtained by the absolute square value $|h(x,y)|^2$. By changing the value of z=d in equation (12), an image at an arbitrary position (in-focus position) in the recorded three-dimensional image can be displayed.

(Interference Fringe Pattern Extraction Step S34)

An interference fringe image K, in which the influence of the speckles is reduced, can be obtained by extracting the interference fringe pattern F by performing spatial frequency filtering to the reconstructed image $|h(x, y, d)|^2$ at position z=d to extract only the component of the single spatial frequency fi of the interference fringe pattern F. Refer to FIG. 5B and its explanation. The spatial frequency filtering for interference fringe pattern extraction is realized by performing a fast Fourier transform (FFT) to the reconstructed image $|h(x, y, d)|^2$, performing filtering processing in this frequency space, and then that performing the fast Fourier transform (inverse transform) again.

(In-Focus Judgment Step S35)

The interference fringe image K of reduced influence of the speckles can be generated, even if the position z=d, namely image reconstruction position (focal distance), is arbitrarily changed. Therefore, the measurement of object shape under the condition that the influence of the speckles is reduced can be performed by using a plurality of interference fringe images K of different focal distances, and by determining the in-focus position, namely the in-focus point zp, for each measurement point P(xp, yp) through derivation of an in-focus measure (measure for judging if in-focus or not), for example using the contrast, and following in-focus judgment.

(Other Embodiment of the Focusing Repetition Step)

Figure 13:
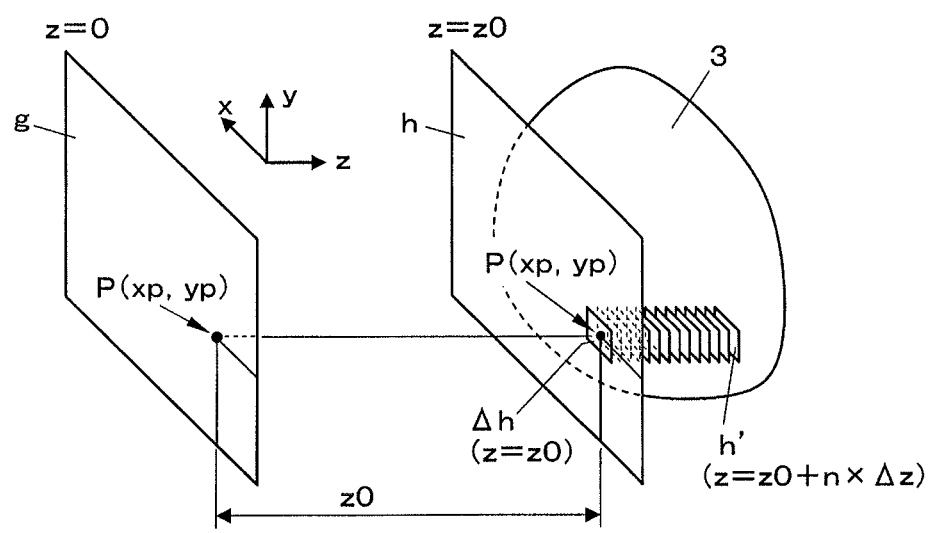
FIG. 13 is a perspective diagram explaining another embodiment of a measurement step in the measurement method.
Figure 14:
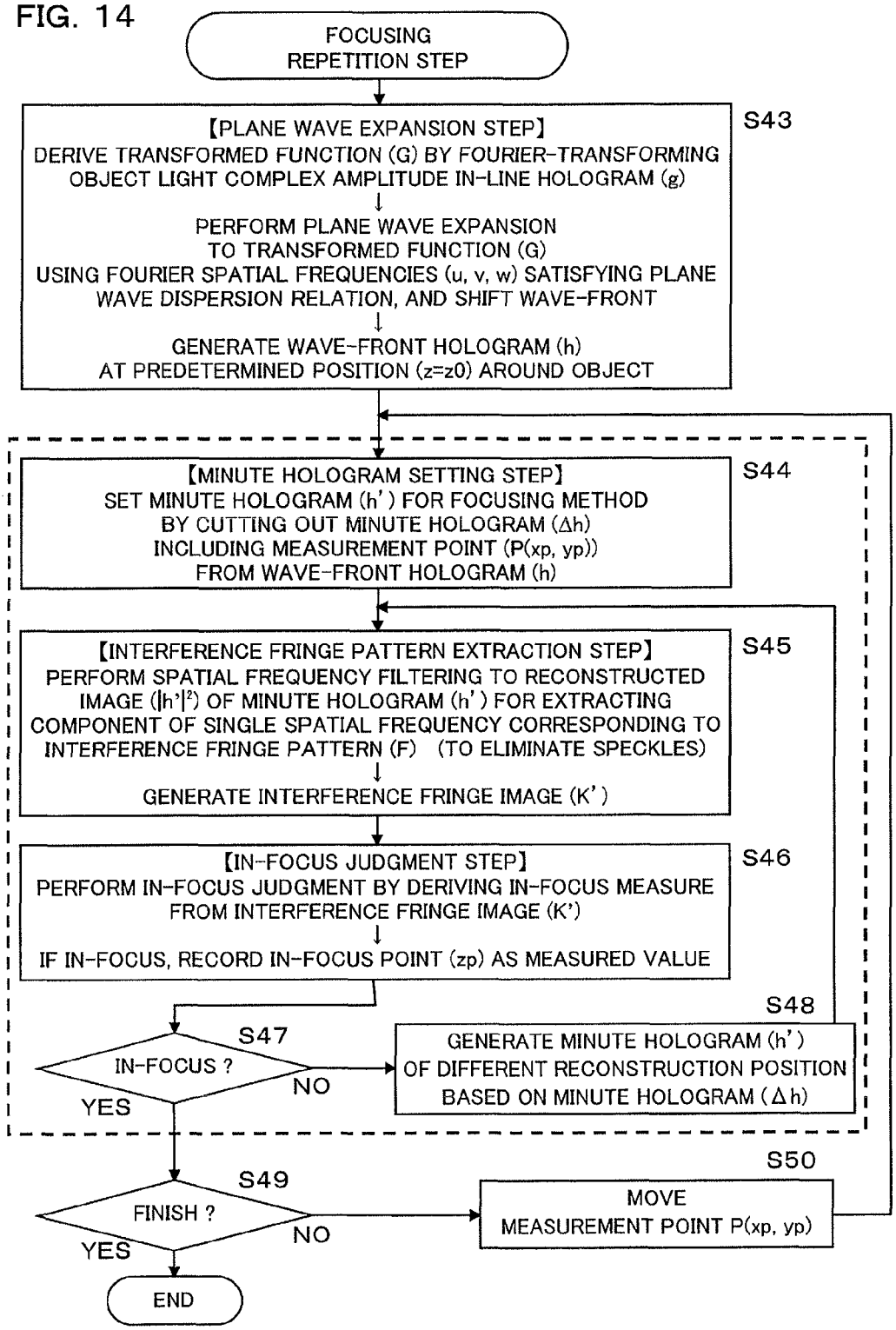
FIG. 14 is a flow chart of a focusing repetition step in the measurement step.

FIGS. 13 and 14 show other embodiment of the focusing repetition step (#2). This embodiment performs the focusing method to each of two kinds of minute holograms Δh and h' instead of using the whole wave-front hologram h(x, y, d) as the target for the focusing method. This point using the minute holograms Δh and h' is the point different from the embodiment shown in above-mentioned FIG. 12. As shown in FIG. 13, the minute hologram Δh is a minute hologram cut out so as to contain a measurement point P(xp, yp) from a wave-front hologram h which is generated at predetermined position z=z0 nearer to the surface of the object 3 than the hologram plane (z=0). The minute hologram h' is generated based on the minute hologram Δh, and a plurality of such minute holograms having different focal positions, for example in every Δz, are generated. In addition, the minute hologram Δh can be assumed as the minute hologram h' in the meaning that which is set as the target for the in-focus judgment. The cutting size of the minute hologram Δh is set so that sufficient accuracy and suitable processing time would be available based on an accuracy of shape measurement (resolving power) in the x-direction and y-direction. In the distance measurement using the focusing method, distances to each measurement point on an object surface are obtained by searching the focal distance with which a reconstructed image of an interference fringe pattern converges most vividly. Therefore, in the distance measurement using the focusing method, a spread around the measurement point needs to be large enough to contain the difference of the light-and-shade of the projected interference fringe pattern, and the minute hologram Δh is cut out with such size. In addition, "cut out" means that computing range is numerically limited, and a rectangular window function can be used in such a calculation, for example.

As shown in FIG. 14, the contents of processing in a plane wave expansion step (S43) of this embodiment are the same as that of processing in the plane wave expansion step (S33) of above-mentioned FIG. 12. However, what is necessary is to perform generation of the wave-front hologram h in the plane wave expansion step (S43) of this embodiment only once at predetermined position z=z0 near the surface of the object 3, without repeating. The position z=z0 can be set based on the information at the time of recording of the off-axis hologram $I_{OR}$, or based on an approximate position of the object obtained by simple processing of special low precision from an off-axis hologram $I_{OR}$. In the next minute hologram setting step (S44), a minute hologram Δh containing a predetermined measurement point P(xp, yp) is cut out.

In the next interference fringe pattern extraction step (S45), an interference fringe image K', in which the influence of the speckles is reduced, can be generated by extracting the interference fringe pattern F by performing spatial frequency filtering to the reconstructed image $|h'|^2$ of the minute hologram h' (in the first round, it means the minute hologram Δh) to extract only the component of the single spatial frequency fi of the interference fringe pattern F. In an in-focus judgment step (S46), an in-focus measure is derived from the interference fringe image K', and the in-focus judgment is performed. If in-focus is approved, the in-focus point zp is recorded as an object shape data at the measurement point P(xp, yp). The in-focus judgment is performed by: recording each in-focus measure at every z position, for example, in the repetition processing described below; detecting the maximum of the in-focus measures; and making the z position, which gives the maximum, the in-focus point zp.

When in-focus is not approved in the in-focus judgment step (S46) (NO in S47), a minute hologram h' is generated based on the minute hologram Δh at the position z=z0+Δz (generally z=z0+n×Δz) (S48). This generation processing is performed by following equations (14) and (15) equivalent to above equations (11) and (12).

$$G(u,v)=\iint \Delta h(x,y)\exp[-i2\pi(ux+vy)]dxdy \quad (14)$$

$$h'(x,y)=\iint G(u,v)\exp[i2\pi w(u,v)\Delta z]\exp[i2\pi(ux+vy)]dudv \quad (15)$$

The processing from the step (S45) is repeated using a new minute hologram h' generated by above equations (11) and (12). Moreover, when in-focus is approved in the in-focus judgment step (S46) (YES in S47) and measurement process is not finished (NO in S49), the measurement point P(xp, yp) is moved (S50), and the processing from the step (S44) is repeated. When the shape measurement for all points of the predetermined measurement point P(xp, yp) is completed (YES in S49), the focusing repetition step is finished and the three-dimensional shape measurement ends.

In this embodiment, the minute hologram h' is generated based on the minute hologram Δh having few amounts of information as mentioned above, however, necessary information required for the local in-focus judgment can be provided. According to such a measurement method, the load of computation can be reduced and an efficient highly precise three-dimensional shape measurement can be performed. Moreover, if it is necessary, a plurality of minute holograms Δh of different z-direction positions and minute holograms h' based on them may be used by setting z=z0 at a plurality of positions. Moreover, the position of z=z0 may be changed for every domain in the xy-plane based on prior information or the low precision measurement done as pretreatment.

(Embodiment of Further Others of the Focusing Repetition Step)

Figure 15:
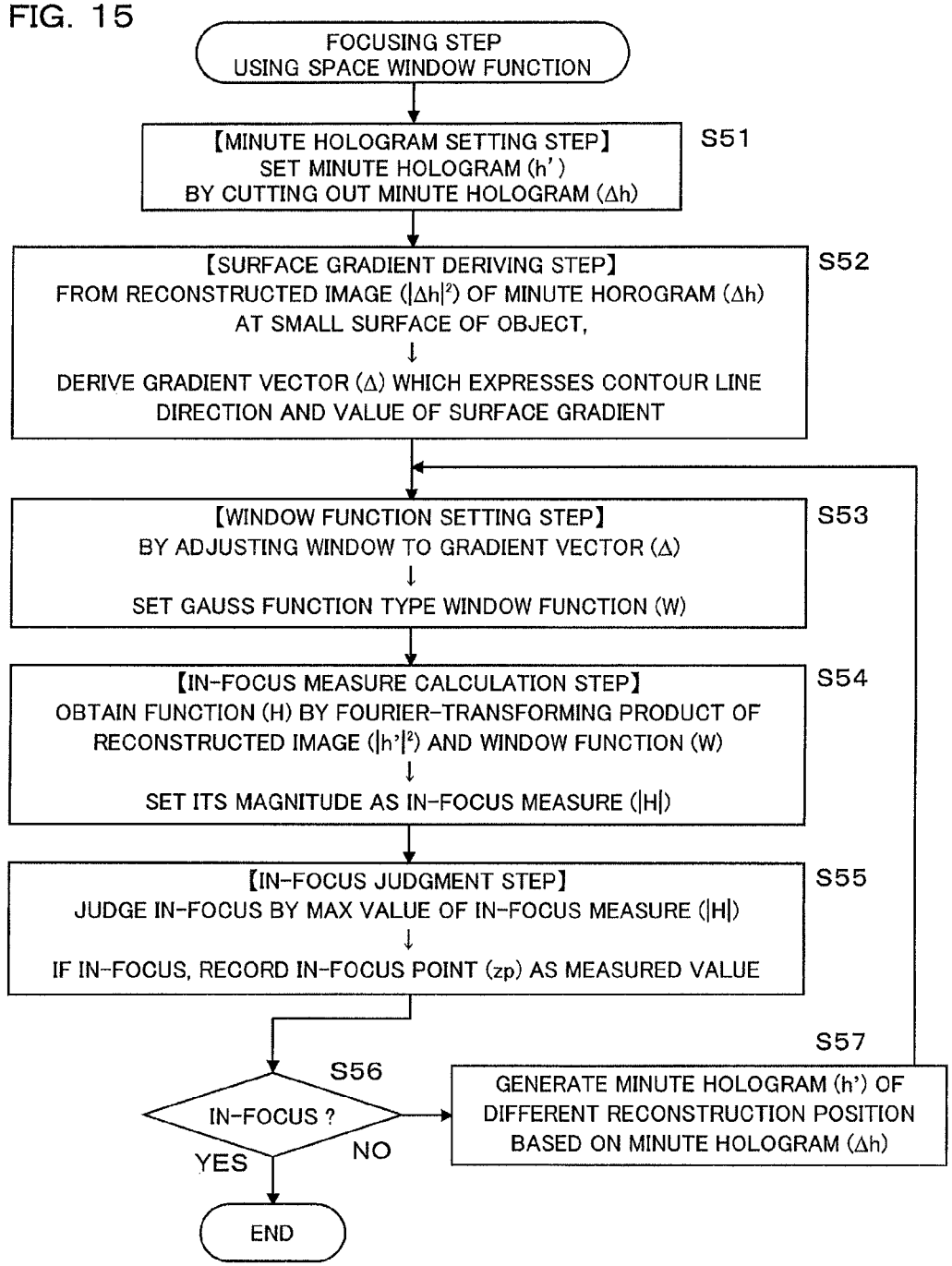
FIG. 15 is a flow chart of a focusing method step according to another embodiment in the measurement step.
Figure 16:
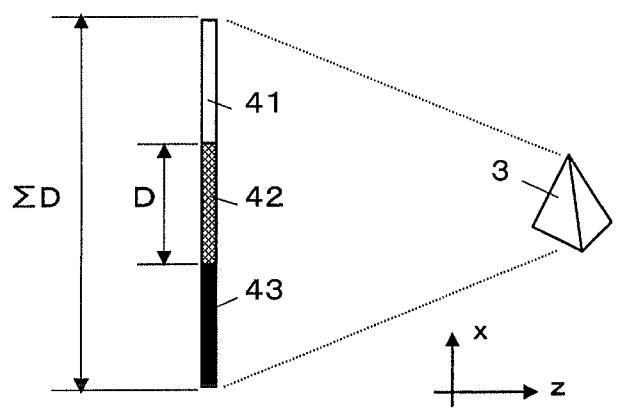
FIG. 16 is a plan view showing a relation between a photo detector and an object for explaining a three-dimensional shape measurement method and device according to further other embodiment.

FIGS. 15 and 16 show the embodiment of further others of the focusing repetition step (#2). This embodiment performs the focusing method using a space window function, and intends to lead the processing in steps (S44) to (S48) shown within a broken line in above-mentioned FIG. 14 to high precision. An outline is described; this focusing repetition step performs the in-focus judgment by using the magnitude of a in-focus measure H, which is a function obtained by Fourier-transforming a product of a reconstructed image $|h'|^2$ made of the square of the absolute value of a minute hologram h' and a window function W using a single spatial frequency fi. As the window function W, for example, a window function of a Gauss function type can be used. When setting the form of the window function W, a gradient of the minute surface on the object corresponding to the minute hologram h' is took into account. The mutual sizes of the window function W and the minute hologram h' are set so that the domain of the minute hologram h' may include a domain which the window function W covers. Moreover, the size of the window function W is set so that there exists a spread around the measurement point which is large enough to contain the difference of the light-and-shade of the projected interference fringe pattern.

In FIG. 15, a minute hologram setting step (S51) is the same as the minute hologram setting step (S44) described with the above-mentioned FIG. 14. The next surface gradient deriving step (S52) derives a gradient vector Δ of the minute surface of the object 3 contained in the minute hologram Δh as an image. The gradient vector Δ is a vector quantity showing how much and in what direction does the minute surface on the object incline from a zero-gradient reference plane which is a xy-plane, namely the hologram plane, in other word, the light receiving surface of the photo detector 4. The gradient vector Δ is expressed using an angle showing the direction of a contour line in a minute surface of the object and a gradient angle of the surface.

A method for deriving the gradient vector Δ is described. The gradient vector Δ is derived, for example, by Fourier-transforming the reconstructed image |Δh|² made of the square of the absolute value of the minute hologram Δh using the single spatial frequency fi, and by obtaining a two-dimensional contrast image made of the absolute value of the function resulted from the Fourier-transforming. This contrast image is an image from which the fine varying component (alternating current component) caused by the interference fringe pattern F is eliminated, and is an image which expresses large scale changes of the shape in the whole of the reconstructed image |Δh|².

The next window function setting step (S53) sets the form of the window function W adjusting to the above-mentioned gradient vector Δ. The spatial distribution of the projected interference fringe pattern reconstructed near the measurement point P(xp, yp) depends on the size and direction of the gradient vector Δ on the object surface. Therefore, in order to raise the accuracy of measurement, it is effective to set the values of parameters for determining the width and form of the window function W by using a spatial distribution of the contrast of the interference fringe pattern reconstructed near a measurement point; here the spatial distribution of the contrast is the gradient vector Δ. Moreover, in the distance measurement using the focusing method, a spread around a measurement point is necessary for presenting an in-focus measure of the projected interference fringe pattern, for this reason a space window function W(x−xp, y−yp) centering at measurement point P(xp, yp) is set for each measurement point in the xy-plane. About the setting of these window functions W will be described after explanation of the following in-focus measure calculation step (S54), in-focus judgment step (S55), and repetitive operation step (S57).

The in-focus measure calculation step (S54) sets an in-focus measure based on a function H of following equation (16) which is made by Fourier-transforming a product of the reconstructed image |h'(x, y, z)|² made of the square of the absolute value of the minute hologram W and the window function W(x−xp, y−yp). As the window function W, a function W, for example, of a Gauss function type shown in following equation (17) can be used.

$$H(f_x, f_y, z) = \int\int |h(x, y, z)|^2 W(x - x_p, y - y_p)\exp[-i2\pi(f_x x + f_y y)]dxdy \quad (16)$$

$$W(x - x_p, y - y_p) = \exp\left\{-\left(\frac{x - x_p}{a}\right)^2 + \left(\frac{y - y_p}{b}\right)^2\right\} \quad (17)$$

The function H of above equation (16) becomes a component H(fi, 0, z) having only the same spatial frequency fi as that of the projection interference fringe pattern F by setting fx=fi and fy=0, i.e., by performing Fourier-transform processing using the single spatial frequency fi. The magnitude |H(fi, 0, z)| of this component denotes degree of focusing to the object surface, and becomes the maximum at z=zp in-focus. Therefore, the in-focus judgment step (S55) determines the distance zp to the object surface at the measurement point (xp, yp) by using H (fi, 0, z) as the in-focus measure, and by judging in-focus with the magnitude of the in-focus measure H, i.e., with the maximum value of the absolute value |H|. When it is not judged as in-focus in the in-focus judgment step (S55) (NO at S56), a minute hologram h' having different reconstruction position z is generated based on the minute hologram Δh (S57), and the processing from the step (S53) is repeated until YES is attained in the step (S56). The processing in the step (S57) is the same as the processing of the step (S48) in FIG. 14.

By using the function H for in-focus measure and the window function W of above equations (16) and (17), highly precise three-dimensional shape measurement can be performed efficiently. This is further described. Generally, in order to search the in-focus point zp to each measurement point (xp, yp), it is necessary to perform image reconstruction, changing the focal distances. In this case, images only around the measurement point are required and images of the overall object are not required. Therefore, the computing time of the image reconstruction for in-focus point search can be substantially shortened by reconstructing one arbitrary focus image after another using a minute hologram Δh, and determining the distance to the measurement point on an object surface by the focusing method. It is necessary to set the size of the minute hologram Δh larger than that of the window function W (window width).

Next, the gradient vector Δ and the window function W are described. The function H(fi, 0, z) contains an alternating current component A(fi, 0, z) of the projected interference fringe pattern and a residual speckle component S(fi, 0, z) which was not eliminated. That is, H=A+S. The speckle component S(fi, 0, z) causes a main measurement error in the focusing method. The alternating current component A(fi, 0, z) is proportional to the area of the window of the window function W. On the other hand, the speckle component S(fi, 0, z) which is a random noise is proportional to the size of the window function. Therefore, a ratio η=S(fi, 0, z)/H(fi, 0, z) of the speckle component can be made smaller by taking a larger area of the window. However, when the area of the window is enlarged, the uncertainty of the position of the measurement point P(xp, yp) increases. Incidentally, the reconstructed image of the interference fringe pattern F is reconstructed along the contour line on the object surface where it is in-focus. And, a width ρ of the spatial distribution of the interference fringe pattern intensity in a direction vertical to the contour line (for example, the half-value width of the light-and-shade distribution of one fringe image) is inversely proportional to the size of the gradient vector Δ (written as gradient Δ with the same symbol) of an object surface.

Here, the above-mentioned points are described by using the fringe interval a of the interference fringe pattern F, a width D (size) of the photo detector 4, a numerical aperture NA=D/(2z) of a hologram, and the gradient Δ of the object surface. A depth-of-focus ζ of a reconstructed image of the interference fringe pattern is estimated to be ζ=α/(NA), and the width ρ of the intensity distribution of the interference fringe pattern is estimated to be ρ=α/((NA)Δ). That is, to make a ratio η=S(fi, 0, z)/A(fi, 0, z) of the speckle component small, it is necessary to set a width WT of the window function in the direction vertical to the contour line within the limits of WT<ρ. A direction of a contour line of an object surface and a direction of surface inclination, namely a direction vertical to the contour line, are obtained as a gradient vector Δ from the reconstructed image |Δh|² of the interference fringe pattern in the surface gradient deriving step (S52).

Since the depth-of-focus ζ becomes smaller and the sensitivity of the in-focus measure to a distance change becomes higher by making the fringe interval α of the interference fringe pattern F smaller, accuracy of the distance measurement can be raised. Moreover, when the gradient Δ of an object surface becomes smaller and then the object surface approaches parallel to the hologram plane, the width ρ of interference fringe pattern intensity distribution becomes larger, the width WT of the above-mentioned window function can be set wide, and the accuracy of measurement can be raised. Since the influence of position uncertainty on the in-focus measure is small in the direction of the contour line, it becomes possible to hold the influence of the speckles small by setting the window function width in this direction large. What is necessary is just to adjust shape parameter a and b of the window function W in above equation (17) based on those facts. Moreover, the window function W of above equation (17) is a function whose direction of the window is fixed to the x-direction and y-direction, however, by rotating the window function W in xy plane, it can be made into a window function W having a shape along the direction of a contour line.

As shown above, the relative accuracy of measurement can be made higher by making: the fringe interval α of the interference fringe pattern F smaller but within a range that the resolution of the reconstructed image does not exceed the limit; the gradient Δ of an object surface smaller; and the window function width in the direction of a contour line larger. Since the gradient Δ of an object surface is dependent on the relative disposition of the object 3 to the photo detector 4, what is necessary is just to adjust the disposition as much as possible.

(Raising Accuracy Using a Plurality of Recorded Holograms)

Figure 17:
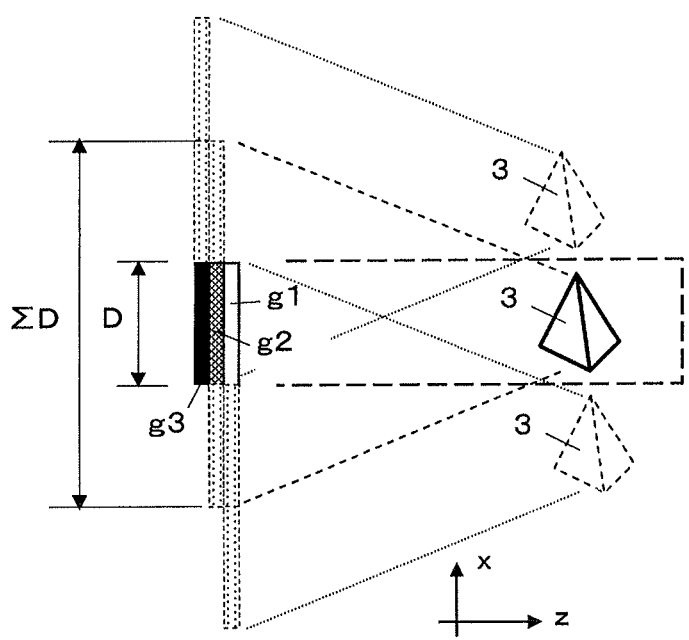
FIG. 17 is a plan view showing a relation between a hologram and a reconstructed image for explaining the measurement method.

FIGS. 16 and 17 show other embodiment of the measurement method. As shown in FIG. 16, this embodiment uses three photo detectors 41, 42, and 43 to record an image of the interference fringe pattern projected on the surface of the object 3 in holograms. The constitution of the interference fringe pattern F (not shown) is supposed to be the same, for example, as the constitution shown in FIG. 3. The photo detectors 41, 42, and 43 are arranged along the arranging direction (x-direction) of the stripes of the interference fringe pattern F (not shown). The number of the photo detectors, generally, can be made plural. Thus, a vertical direction interference fringe pattern can be recorded using the plurality of photo detectors arranged in the x-direction (horizontal direction), and a complex amplitude in-line hologram with a large numerical aperture in the x-direction can be generated using the plurality of recorded holograms.

Thus, for example, in a three-dimensional measurement using a projected interference fringe pattern in vertical direction, the accuracy of measurement can be raised by improving resolving power δ in horizontal direction. Therefore, single shot records of the interference fringe pattern are simultaneously performed using n photo detectors arranged horizontally, and a plurality of off-axis holograms $I_{OR}(j)$, $j=1, \ldots, n$ are acquired simultaneously. Object light complex amplitude in-line holograms $g(j)$, $j=1, \ldots, n$ are generated from each of these off-axis holograms $I_{OR}(j)$, $j=1, \ldots, n$. Thus, as shown in FIG. 17, each hologram $g(j)$, $j=1, \ldots, n$ is piled up mutually and synthesized, and the synthesized hologram is set as an object light complex amplitude in-line hologram g. By using the synthesized object light complex amplitude in-line hologram g, an image of the projected interference fringe pattern of improved resolving power δ in horizontal direction can be reconstructed, therefore the accuracy of distance measurement can be raised effectively.

Furthermore, explanation is continued. Generally, the resolving power of a reconstructed image can be improved by using a large numerical aperture hologram g(x, y). However, when performing image reconstruction from the large numerical aperture hologram using FFT, if the number of sampling points became excessive, computing time would increase and image reconstruction would become difficult. Incidentally, according to the superposition principle of a wave, data composed of mutually different frequency bands can be processed in the state where they are added mutually. In other words, each information recorded in a different frequency band is saved without being lost even if they are piled up spatially. If this fact is used, a hologram of wide band and small numerical aperture can be generated by piling up, i.e. superimposing, holograms of wide band. Moreover, the complex amplitude in-line hologram $J_{OL}$ and the object light complex amplitude in-line hologram g(x, y) possess information for image reconstruction in each divided domain. Using this fact, a small numerical aperture hologram in which wide band information is included can be generated by piling up wide band and large numerical aperture holograms g(x, y). That is, when a large hologram g of horizontal overall width n×D is divided in n divisions as g(j), $j=1, \ldots, n$, and these are piled up mutually and synthesized to yield a synthesized hologram $\Sigma g(j)$ of horizontal width D, the synthesized hologram $\Sigma g(j)$ becomes a periodic hologram. A high resolution image can be reconstructed from the synthesized hologram $\Sigma g(j)$. Moreover, the computing time with the synthesized hologram $\Sigma g(j)$ is shortened by 1/n in the case the hologram g of overall width n×D. It should be noted that if the width D became smaller than the size of the reconstructed image, the reconstructed images would overlap between adjacent ones, therefore the width D should be set larger than the image to be reconstructed.

(Three-Dimensional Shape Measurement Device)

Figure 18:
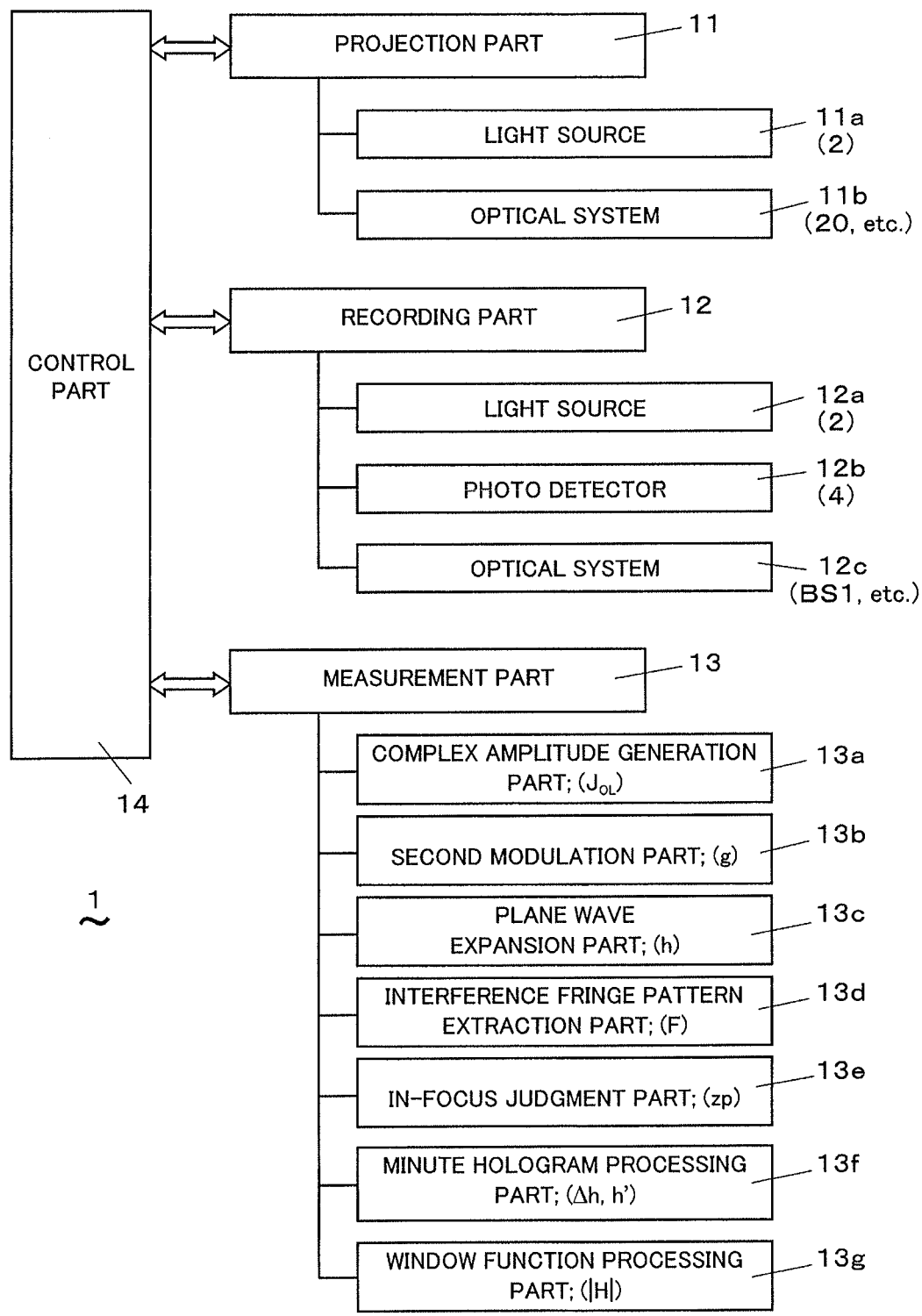
FIG. 18 is a block diagram of a three-dimensional shape measurement device according to an embodiment of the present invention.

FIG. 18 shows the three-dimensional shape measurement device 1. The measurement device 1 is equipped with a projection part 11, a recording part 12, a measurement part 13, and a control part 14 which controls those. The projection part 11 prepares an interference fringe pattern F, which has a single spatial frequency fi and sinusoidal light intensity, by interference between two coherent laser beams, and projects it onto an object surface. The projection part 11 is equipped with a light source 11a which emits a laser beam for generating the interference fringe pattern F, and an optical system 11b with which the laser beam from the light source 11a is led to the object surface. The light source 11a is the laser 2 shown in FIG. 2, for example, and in this case a light source 12a (mentioned later) used in a recording part 12 is shared. The optical system 11b includes, for example, the group of optical elements for the illumination lights L1 and L2 shown in FIG. 2.

The recording part 12 records the interference fringe pattern F projected onto the object surface by the projection part 11 in a digital hologram as an off-axis hologram $I_{OR}$ with a photo detector. The recording part 12 is equipped with a light source 12a which emits a laser beam for an off-axis reference light R and an in-line reference light L for reconstruction, a photo detector 12b, and an optical system 12c with which the laser beam from the light source 12a is led to the photo detector 12b. The light source 12a is, for example, the laser 2 shown in FIG. 2, and in this case, the light source 11a used in the projection part 11 is shared. The photo detector 12b is, for example, an image sensor such as CCD, and for example, the photo detector 4 in FIG. 2. The optical system 12c includes, for example, the group of optical elements for the reference light R shown in FIG. 2, and the group of optical elements, for the reference light L shown in FIG. 6. The projection part 11 projects the interference fringe pattern F onto the object surface so that the arrangement of the interference fringe pattern (F) seen from the light receiving surface of the photo detector 4 is fixed irrespective of the positions of the object surface. Moreover, the recording part 12 records an off-axis hologram $I_{LR}$ based on the off-axis reference light R and the in-line reference light L for reconstruction.

The measurement part 13 generates a plurality of reconstructed images, which are changed in the focal distances, of the interference fringe pattern F from a digital hologram $I_{OR}$ and $I_{LR}$ recorded by the recording part 12, and finds distances to each point of the object surface by applying the focusing method to the interference fringe pattern F in each reconstructed image. The measurement part 13 is equipped with a complex amplitude generation part 13a, a second modulation part 13b, a plane wave expansion part 13c, an interference fringe pattern extraction part 13d, an in-focus judgment part 13e, a minute hologram processing part 13f, and a window function processing part 13g. The notation, like $(J_{OL})$ etc., additionally written to each part name in the block shows main output data or processing target data.

The complex amplitude generation part 13a generates a complex amplitude in-line hologram $J_{OL}$ from an off-axis hologram $I_{OR}$ recorded by the recording part 12. The second modulation part 13b generates an object light complex amplitude in-line hologram g in a hologram plane by performing spatial heterodyne modulation to the complex amplitude in-line hologram $J_{OL}$. The plane wave expansion part 13c generates a wave-front hologram h by performing a plane wave expansion using Fourier spatial frequencies (u, v, w) to a transformed function G derived as the result of Fourier-transform of the object light complex amplitude in-line hologram g. In addition, the plane wave expansion part 13c can generate a free focal image (arbitrary focal image). Moreover, the plane wave expansion part 13c performs aperture-synthesis processing, which divides a large numerical aperture hologram g(x, y) and piles up the results mutually to generate a hologram Σg(j) of small numerical aperture in which wide band information is included.

The interference fringe pattern extraction part 13d generates images and holograms containing the information of low noise ratio on the interference fringe pattern F, which is a target for in-focus judgment, by applying filtering processing to various kinds of reconstructed images, and thereby extracting the component of the single spatial frequency fi corresponding to the interference fringe pattern F, and reducing the speckle component. The in-focus judgment part 13e determines the in-focus point zp of the measurement point P(xp, yp) by judging in-focus using reconstructed images having different focal positions generated from the wave-front hologram h, minute holograms Δh, h', etc. The minute hologram processing part 13f performs processing for cutting out the minute hologram Δh from the wave-front hologram h, or for setting the window function for the cutting, or for generating the minute hologram h' from the minute hologram Δh. The window function processing part 13g generates an in-focus measure H by Fourier-transforming the product of a reconstructed image $|h'|^2$, which consists of the square of the absolute value of the minute hologram h', and a window function W using the single spatial frequency fi of the interference fringe pattern F. The measurement part 13 determines the in-focus point by judging in-focus using the magnitude |H| of the in-focus measure H.

The control part 14 consists of common calculating machines equipped with a monitor display, the I/O devices for control signal or data, memories, etc. Each part of the above-mentioned measurement part 13 mainly consists of software, and, for example, these are memorized by a program store part of the control part 14, are called at any time, and operate. The control part 14 takes charge of the role of the computer 5 shown in FIGS. 2 and 6, etc. Such a three-dimensional shape measurement device 1 can perform a three-dimensional shape measurement by performing the three-dimensional shape measurement method mentioned above.

According to the three-dimensional shape measurement device 1 of the present invention, since an exact and distortionless high resolution free focal image can be recorded using a single shot recording method and can be reconstructed, reducing the influence of the speckles, it is possible to measure a position, a shape, a deformation etc. of a moving object in a 4-dimensional space (space+time) with high precision using the focusing method. In other words, according to the measurement device 1, by performing a single shot record of each off-axis hologram $I_{OR}$, beforehand, for each of various shapes or postures of an object 3 under the condition that an off-axis hologram $I_{LR}$ is recorded by a single shot record, it becomes possible, by post-processing, to perform shape measurement of the object 3 in its shape or posture for every off-axis hologram $I_{OR}$. Therefore, taking advantage of the single shot record, the problem of the three-dimensional measurement of a moving object can be solved. Moreover, according to the measurement device 1, since necessary holograms can be recorded without using an image formation lens, problems such as a focal gap and image distortion caused by the use of an image formation lens can be avoided. Therefore, highly precise shape measurement having no distortion can be performed for an object recorded not only in air but in water which has a refractive index different from that of air. Moreover, a shape measurement of an object moving in high-speed becomes possible by high-speed recording using a pulsed laser as the light source 12a (laser 2).

(Practical Example)

Practical examples of the three-dimensional shape measurement method are described with FIGS. 19 to 24. In order to demonstrate the advantage of the measurement method of the present invention for the high precision measurement, a distance measurement experiment measuring distances to a diffusing flat surface (light diffusive flat surface) was conducted. The measurement object is a 2-cm cubic glass which surface irregularity is below wave length, and the surfaces were coated with 10 μm or less-thick white paint. The measurement object was arranged at the position of about 85 cm from an image sensor, and the object surfaces were tilted 45 degrees. An interference fringe pattern was projected onto the surfaces of the measurement object so that a striped pattern in the vertical direction might be made. Therefore, the arrangement is the same as that shown in FIG. 3. The interference fringe pattern on the surfaces of the measurement object was recorded using above-mentioned single shot holography. Obtained complex amplitude in-line holograms have a pixel pitch of 7.4 μm and a pixel number 4096×4096, and images are reconstructed by numerical computation from the holograms.

Figure 19A:
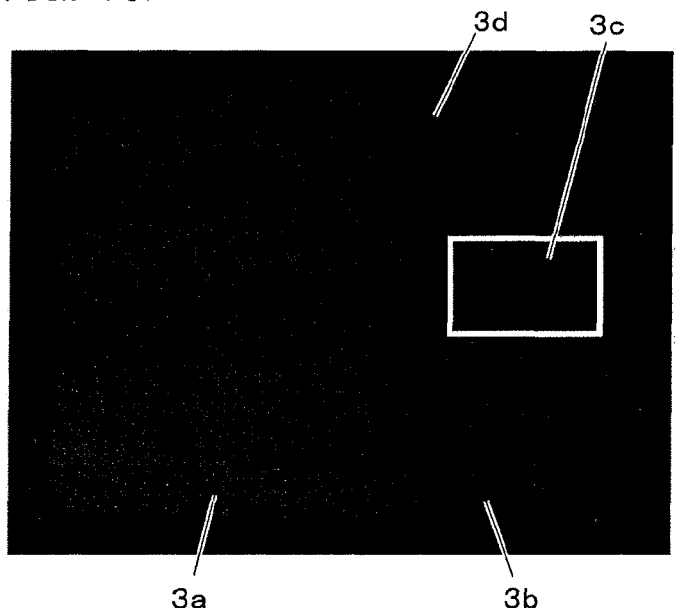
FIG. 19A is an image of an interference fringe pattern obtained using the three-dimensional shape measurement method and the three-dimensional shape measurement device of the present invention.
Figure 19B:
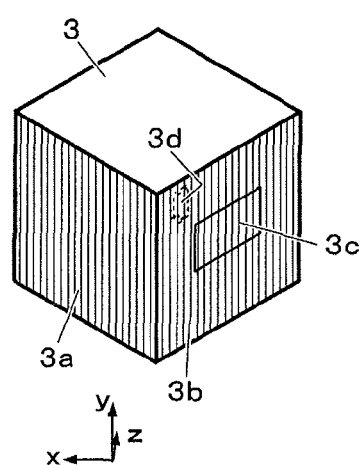
FIG. 19B is a perspective diagram showing an arrangement of an object whose image is taken in the image.
Figure 20:
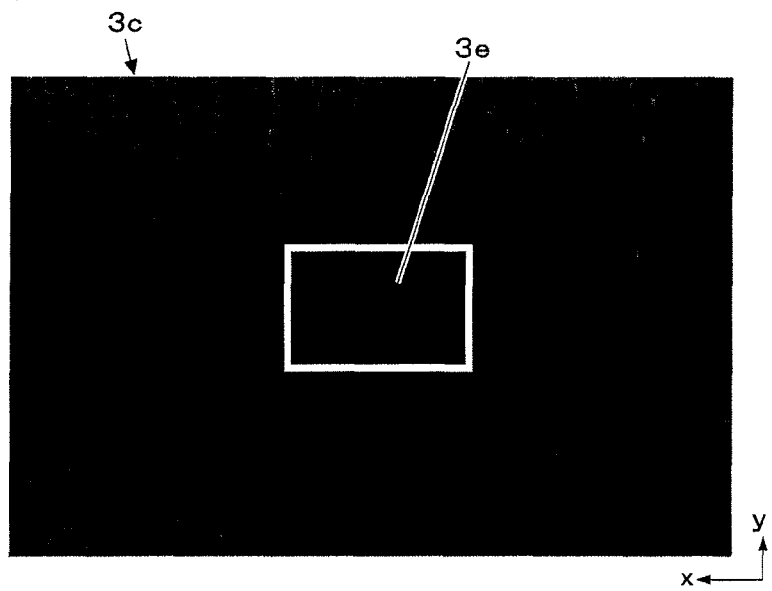
FIG. 20 is an enlarged image of an image area $3c$ in FIG. 19A.

FIG. 19A shows an image reconstructed in the position near the surface of the object 3, and FIG. 19B shows the part of the measurement object 3 corresponding to the reconstructed image. In the figures, the x-direction is horizontal, the y-direction is vertical, and the surfaces 3a and 3b of the object 3 are recorded and reconstructed together with the interference fringe pattern in the vertical direction. The enlarged view of the area 3c in the reconstructed image is shown in FIG. 20. In addition, the pattern 3d in FIGS. 19A and 19B is a pattern for a position check. In the reconstructed image 3c of FIG. 20, an interference fringe pattern of a fringe interval about 200 μm is reconstructed in the width about 6 mm in the x-direction.

Figure 21:
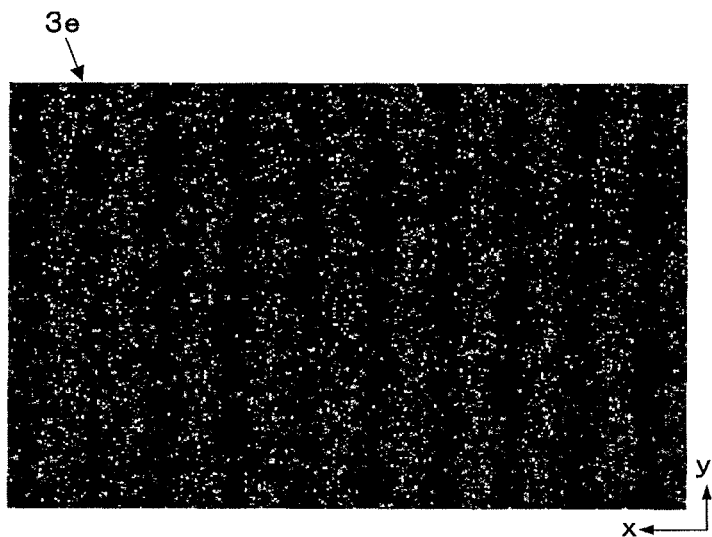
FIG. 21 is an enlarged image of an image area $3e$ in FIG. 20.
Figure 22:
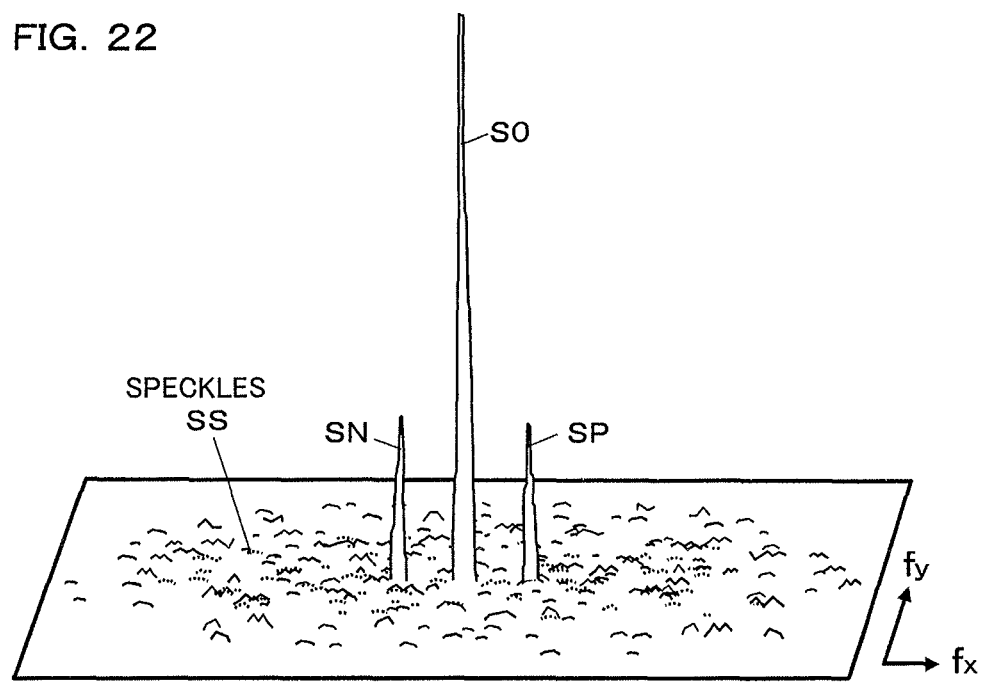
FIG. 22 is a three-dimensionally displayed figure of spectrum showing distribution of two-dimensional spatial frequency for the image in FIG. 21.

Moreover, FIG. 21 shows the enlarged view of the area 3e in FIG. 20. The size of the image shown in this FIG. 21 is equivalent to the size of the minute hologram Δh, and the size of the window function W is within this image. Moreover, FIG. 22 shows a spectrum distribution of the reconstructed image 3e of FIG. 21 in a two-dimensional frequency space (fx, fy-space). In this spectrum distribution, a peak of a dc component S0 having a high peak, and, at its both sides, two peaks of alternating current components SP and SN corresponding to the spatial frequencies fi and −fi located in a line in fx-direction appear, and further a speckle component SS with a wide frequency span appear as a background component in the spectrum distribution map. If the influence of this speckle component SS were not reduced, the reconstructed image of the interference fringe pattern would become indistinct. In addition, the cross section in fx-direction which passes along the three peaks S0, SP, and SN in this spectrum distribution map corresponds to the figure of FIG. 5A. In addition, if the spectrum distribution of FIG. 22 were obtained based on the data whose size is larger than that of the image of FIG. 21, that is, by increasing the number of stripes in the interference fringe pattern, the peaks of the alternating current components SP and SN would become higher and thinner, but the position resolving power in xy plane would deteriorate.

Figure 23:
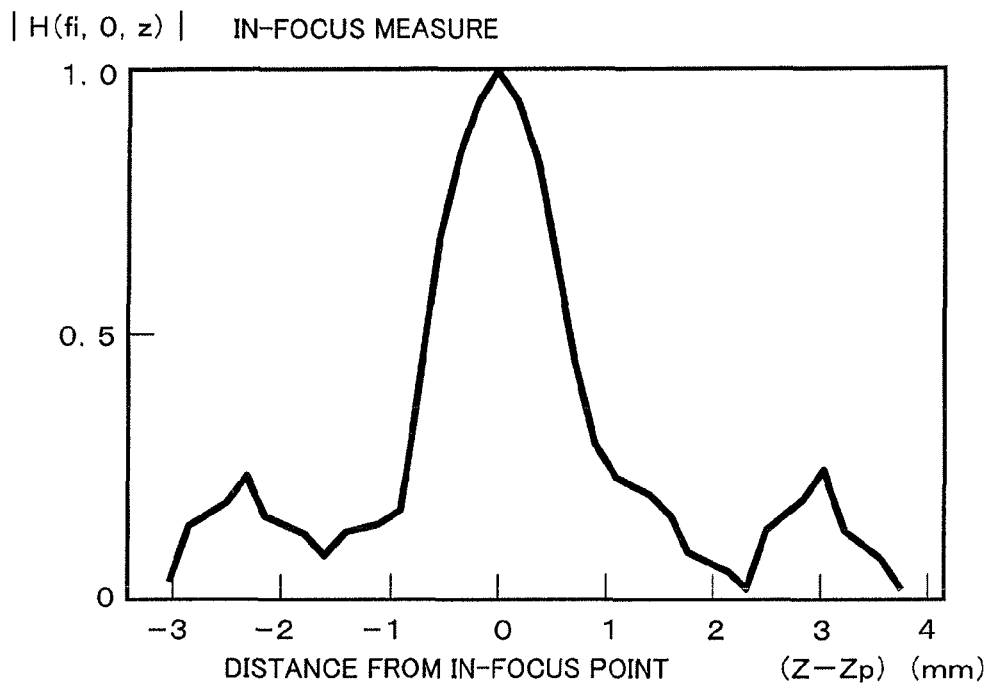
FIG. 23 is a graph showing an example of a situation that an in-focus measure changes depending on a focal position.

FIG. 23 shows an example of an in-focus measure curve, i.e., the in-focus measure |H(fi, 0, z)| described with FIG. 15, measured using a reconstructed image for a certain measurement point P(xp, yp) as dependency on a distance from the in-focus point zp in z-direction. The hologram recording in this case was made by projecting an interference fringe pattern of an interval about 80 μm onto a diffusion flat surface tilted 45 degrees and placed at the distance of 85 cm from an image sensor. This figure shows that an interference fringe pattern is reconstructed in about 2 mm width back and forth the in-focus point zp in depth direction with high contrast, namely, large in-focus measure, and the in-focus measure curve is a good-looking curve almost symmetrical on the in-focus point z=zp within this width. Then, after obtaining the in-focus measure curve, by fitting a model curve to the in-focus measure curve, an automatic detection of the peak of the curve at the focusing point zp, i.e., an automatic detection of the in-focus point zp, can be performed. Moreover, since such fitting can be performed with several points of the in-focus measure value, the in-focus point zp can be detected efficiently using several reconstructed images reconstructed for coarse distance interval Δz.

Figure 24:
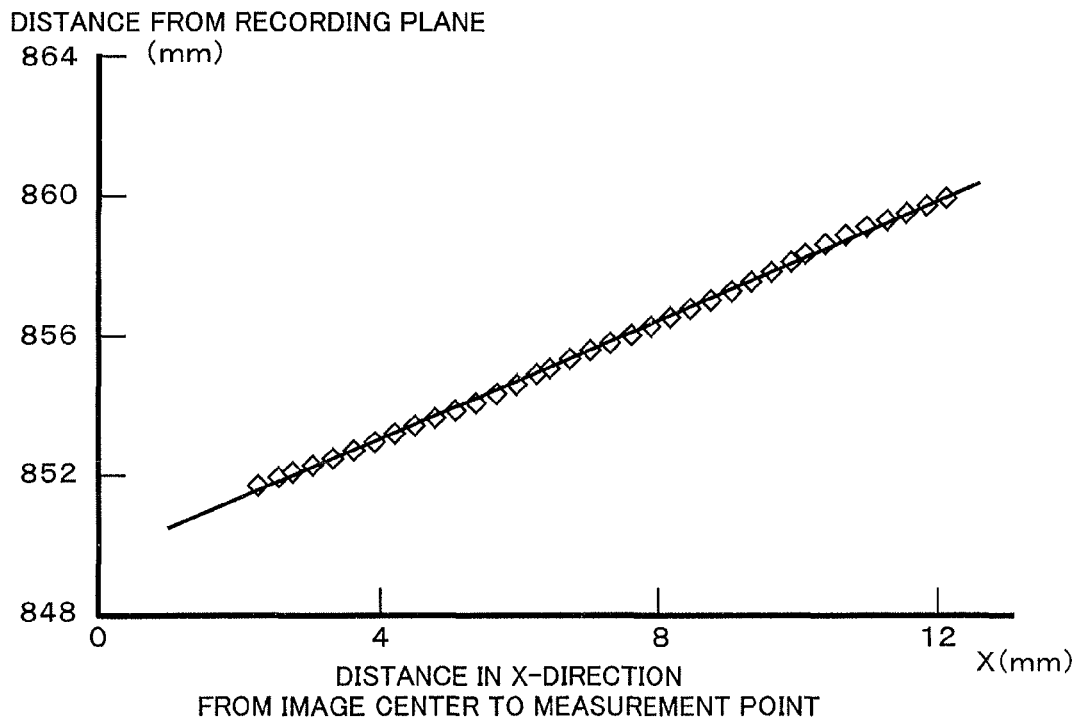
FIG. 24 is a variation diagram for distances to a planar object measured from a hologram which yields the interference fringe pattern image of FIG. 20 using the measurement method of the present invention.

FIG. 24 shows results of measured surface positions along the central horizontal direction on the surface 3b of the object 3 shown in FIG. 19B. In this measurement, an interference fringe pattern with a fringe interval of about 80 μm was projected, and a circular Gauss function type window with a window radius of about 0.5 mm was applied as a space window function. A diffusive flat surface for measurement was placed at the distance 85 cm from an image sensor and tilted about 45 degrees. In the measured result of FIG. 24, a value of 72 μm was obtained as a mean square error of measured distance. In addition, a glass coated with light transparent white paint was used as a photographic subject in this measurement, and therefore high contrast is not obtained, and projection of an interference fringe pattern of high spatial frequency was not made. It can be considered that the measurement error 72 μm is due to mainly the speckles in a reconstructed image. Since projection of an interference fringe pattern in high contrast and high spatial frequency can be performed by coating with a high refractive index and low light absorption rate material, for example, powder of titanium oxide, more highly precise measurement is possible in this case.

In addition, various modification is possible for the present invention, without being restricted to the above-mentioned constitution. For example, constitution of each embodiment mentioned above can be combined mutually. The interference fringe pattern F to be projected onto an object surface can be prepared by the combination of a plurality of single spatial frequency fi. For example, two kinds of interference fringe patterns F1, F2 having mutually different single spatial frequencies f1 and f2 can be prepared, and these can be projected onto an object surface. In this case, what is necessary is to use 2 pairs of two laser beams in order to make each interference fringe patterns F1 and F2, and each interference fringe patterns F1 and F2 can be prepared by each of sets. Moreover, a parallel direction, an orthogonal direction, or an oblique intersection direction may be sufficient as the mode of the directions (arranging directions of fringes) of two kinds of interference fringe patterns F1 and F2. Speaking generally, the present invention can use a plurality of kinds of interference fringe patterns Fi, where each interference fringe pattern Fi has a single spatial frequency fi, and each single spatial frequency fi is separable, namely possible to use filtering, mutually in the spatial frequency space (fx, fy). In other words, if the directions of the interference fringe patterns are different each other, the spatial frequencies can be the same in any direction. For example, in the case of two interference fringe patterns F1 and F2 are orthogonal mutually, it is acceptable that fx=fy=f1=f2. If several interference fringe patterns of different directions are used, the window function W can be set by choosing a suitable interference fringe pattern according to the gradient vector Δ of the object surface.

Here, a method to obtain the phase $\phi_L$ of the in-line reference light for reconstruction is described. In the case that a spherical wave light from a point source is used as an in-line reference light L for reconstruction, if the distance (referred to as γ) between the photo detector 4 and the point source of the reference light L is known, the phase $\phi_L$ can be obtained by calculation. Distance γ can be known by recording a hologram of an object having known scale using the reference light L, and comparing the size of an object image reconstructed from the hologram with the size of the object having known scale. Moreover, a plane wave can be used as the in-line reference light L for reconstruction. In this case, the above-mentioned distance γ can be set as infinite. The phase $\phi_L$ of a plane wave is constant on the light receiving surface of the photo detector 4, and can be easily determined using a hologram of an interference fringe pattern of the reference light L. Moreover, the off-axis reference light R and the in-line reference light L for reconstruction are not limited to a spherical wave light.

INDUSTRIAL APPLICABILITY

The present invention can be used in the field where the three-dimensional shape of a moving, changing, displacing or vibrating object, and of a still object are recorded and measured, for example: a design field, a plastic-working field, a fluid equipment field, a robot vision field, an acceptance inspection field, a medical care and cosmetics field, etc. Moreover, the present invention is applicable to parts inspection in a manufacture site, performance evaluation and fault analysis of parts and apparatus in operational, etc., and also applicable to continuous measurements, in time series, of such as vibration, deformation, or movement of a part or apparatus in a high-speed movement or a high velocity revolution, and to a high speed or real time measurement. Moreover, the present invention for a shape measurement is applicable not only to an object in the air but a moving or still object in media, such as water, which has a refractive index different from that of air.

(Relation Between a Resolution Limit and a Measurement Distance)

In the shape measurement method of the present invention, a resolving power $\delta$ in the crosswise direction (xy-direction) of a reconstructed image is expressed as $\delta=\lambda/(NA)=2\lambda z/D$ using a numerical aperture $NA=D/(2z)$ of the hologram and the light wavelength $\lambda$, and thus the resolving power $\delta$ is proportional to the distance z to the measuring point under a condition that the hologram width D is constant. On the other hand, a depth of focus $\zeta$ is expressed as about $\zeta=\alpha/(NA)$ in the case of the reconstructed interference fringe pattern with a fringe interval $\alpha$. The resolving power in the depth direction (z-direction) is proportional to the depth of focus $\zeta$. If the fringe interval $\alpha$ is set as value $\alpha=k\delta$ proportional to resolving power $\delta$, it becomes $\zeta=\alpha/(NA)=k\lambda/(NA)^2=4k\lambda z^2/D^2$, and the depth of focus $\zeta$ is proportional to the square of the distance z. Therefore, under the condition that the hologram width D is constant, the value of resolving power $\delta$ becomes larger as the distance z becomes larger, and the value of the resolving power for distance detection in a depth direction becomes larger in proportion to the square of the distance z. In other words, the resolution limit changes with distance z; both the resolving power of the reconstructed image and the resolving power of the distance detection deteriorate as the distance z becomes larger; conversely both the resolving power of the reconstructed image and the resolving power of the distance detection improve as the distance z becomes smaller. The relation between the distance z and the resolving powers are shown with concrete numerical examples, under the condition that the hologram width D is constant in the following TABLE 1.

TABLE 1

| Distance z | Resolving power $\delta$ in crosswise direction (xy-direction) | Resolving power in depth direction (z-direction) (proportional to depth of focus $\zeta$) |
|---|---|---|
| 10 cm | 2 to 3 µm | Accuracy of a wave length limit |
| 1 m | 20 to 30 µm | Several 10 micrometers |
| 10 m | 200 to 300 µm | Several millimeters |

(Time Resolution)

In the shape measurement method of the present invention, a time resolution is determined by the number of hologram images acquired per second (frame number). Moreover, since the shape measurement method of the present invention is a single shot record method, this frame number is determined by the working speeds of the projection part 11 and the recording part 12 of the shape measurement device 1. Thus, using a short-pulse-laser light source, for example, a short pulse laser beam of about several ns time width as the light source 11a (2) of the projection part 11, and using a high-speed CMOS having a memory for exclusive use as the photo detector 12a of the recording part 12 (4), 100 million frames ($10^8$ picture/second) are realizable, for example. In this case, the time resolution is $10^{-8}$ second.

(Concrete Application)

As shown in the above-mentioned TABLE 1, the shape measurement method of the present invention is a measurement method which has a big dynamic range for the distance z from the microscopic world at small-end to the world which exceeds several 10 m at big-end. Therefore, a shape measurement can be performed on an object from small to big with a suitable distance z and unprecedented resolving powers. Moreover, since the present invention can record a shape as mentioned above under the unprecedented time resolving power, for example, $10^{-8}$ second, it is applicable to a shape measurement, a displacement measurement, and a vibration analysis during high velocity revolution for: a body of rotation with a depth like a crankshaft, and a multi-stage turbine blade and a centrifugal pump blade for water supply which have a still more large-size and a large depth, etc. Furthermore, it is applicable as means for recording and analyzing: temporal changes of an explosion phenomenon, modification or deformation of an object shape, generation of a crack and its growth caused by a shock of a bullet, and propagation of a surface acoustic wave, etc.

(Comparison with the Conventional Measurement Method)

The above-mentioned applicability are based on the fact that the present invention have following features: (1) a short-pulse-laser light source can be used as a light source for illuminating; (2) calibration of an image sensor is not necessary, (3) measurement of a shape of an object having a large depth is possible; (4) measurement of a complicated shape which has an overhanging shape or discontinuous surface is possible; (5) highly precise measurement is possible; (6) measurement of an underwater object is possible. Such a measurement technology which has those features never having been known before. For example, digital photogrammetry technology and TOF range finding technology are known as three-dimensional shape measurement technology for a moving object, and these are the technology put in practical use at the present day. The digital photogrammetry technology uses a stereo method as a principle, and therefore a calibration of an image sensor is necessary in order to obtain parameters (picture distance, principal point position, lens distortion coefficient) of a camera to be used exactly before measurement. Moreover, the measurement accuracy and measurement depth are severely restricted for a moving object measurement by the resolution limit and the depth of focus of the camera used. The TOF range finding technology detects distance by the round trip time of the light which goes forth and back between a camera and a photographic subject, and can also measure overhanging shape. However, the distance detection resolution power of the device put in practical use remains at about 1 cm, and it is necessary to perform distortion correction of a camera lens for measuring with high precision.

Moreover, the present invention has following advantages in comparison with the conventional shape measurement technology. Since any image formation lens is not used for recording a hologram in the present invention, the calibration for an image sensor such as required in the digital photogrammetry technology is not necessary. Moreover, since an exact free focal image is reconstructed from an in-line hologram recorded with a single shot, compared with the conventional measurement method which uses a camera, it is possible to measure an object shape with larger depth. By using a short pulse laser light source, measurement of around nanosecond high-speed phenomenon occurring in a supersonic moving object, a rotating object, a shock test caused by explosion or bullet, etc. is possible. Furthermore, since distance detection is performed by a focusing method, measurement of the complicated shape which has an overhanging shape or discontinuous surface is possible as like the TOF range finding technology. When an object of rough surface is illuminated with a laser beam, a speckle occurs, but in the present invention, the influence of the speckles is eliminated by projecting an uniform interference fringe pattern having fine equal intervals and performing spatial frequency sampling in order to attain highly precise distance measurement.

This application is based on the Japan patent application 2011-010842, and the contents should unite to the present application invention as a result by referring to the specification and drawings of the above-mentioned patent application.

EXPLANATIONS OF LETTERS OR NUMERALS

1 Three-dimensional shape measurement device
10 Optical system
11 Projection part
12 Recording part
13 Measurement part
13d Interference fringe pattern extraction part
2, 11a, 12a Laser (Light source)
3 Object
4, 41-43, 12b Photo detector (Image sensor)
fi Single spatial frequency
g Object light complex amplitude in-line hologram
g (j) Object light complex amplitude in-line hologram
h Wave-front hologram
h' Minute hologram
Δh Minute hologram
zp In-focus point
F Interference fringe pattern
G Transformed function
H in-focus measure
L In-line reference light for reconstruction
O Object light
P Measurement point
R Off-axis reference light
W Window function
$I_{OR}$ Off-axis hologram
$I_{OR}(j)$ Off-axis hologram
$J_{OL}$ Complex amplitude in-line hologram
$\phi_L$ Phase of the in-line reference light for reconstruction
$\phi_R$ Phase of the off-axis reference light

The invention claimed is:

1. A method for measuring a three-dimensional shape comprising the steps of:
    a projection step for projecting an interference fringe pattern (F) having a single spatial frequency (fi) onto an object surface;
    a recording step for recording the interference fringe pattern (F) projected on the object surface by the projection step as a hologram using a photo detector; and
    a measurement step for generating a plurality of reconstructed images having different focal distances from the hologram recorded by the recording step, and deriving a distance to each point on the object surface by applying a focusing method to the interference fringe pattern (F) in each of the reconstructed images, wherein
    the measurement step comprises an interference fringe pattern extraction step for extracting a component of the single spatial frequency (fi) corresponding to the interference fringe pattern from each of the reconstructed images by spatial frequency filtering when the focusing method is applied.

2. The method for measuring the three-dimensional shape according to claim 1, wherein
    the recording step records the interference fringe pattern (F) as an off-axis hologram ($I_{OR}$) using an off-axis reference light (R).

3. The method for measuring the three-dimensional shape according to claim 2, wherein
    the measurement step comprises:
        a modulation step for performing spatial heterodyne modulation to the hologram based on a phase ($\phi_L$) of an in-line reference light (L) for reconstruction and a phase ($\phi_R$) of the off-axis reference light (R);
        a filtering step for performing spatial frequency filtering to eliminate a conjugate image component from the hologram; and
        a complex amplitude generation step for generating a complex amplitude in-line hologram ($J_{OL}$) from the off-axis hologram ($I_{OR}$) recorded by the recording step by performing the modulation step and the filtering step in this order or reverse order to the off-axis hologram ($I_{OR}$), and wherein
    the measurement step performs the interference fringe pattern extraction step to the plurality of reconstructed images generated by changing focal distances using the complex amplitude in-line hologram ($J_{OL}$) generated by the complex amplitude generation step.

4. The method for measuring the three-dimensional shape according to claim 3, wherein
    the measurement step comprises:
        a second modulation step for generating an object light complex amplitude in-line hologram (g) expressing an object light wave-front on a hologram plane defined with a light receiving surface of the photo detector by performing spatial heterodyne modulation to the complex amplitude in-line hologram ($J_{OL}$) generated by the complex amplitude generation step using the phase ($\phi_L$) of the in-line reference light (L) for reconstruction in order to eliminate a component of the in-line reference light (L) for reconstruction; and
        a plane wave expansion step for generating a wave-front hologram (h) in a predetermined focal position by performing a plane wave expansion to a transformed function (G) derived as a result of Fourier-transform of the object light complex amplitude in-line hologram (g) using Fourier spatial frequencies (u, v, w) satisfying a dispersion relation of a plane wave; wherein
    the measurement step determines an in-focus point (zp) using the wave-front hologram (h) generated by the plane wave expansion step.

5. The method for measuring the three-dimensional shape according to claim 4, wherein
    the recording step acquires a plurality of off-axis holograms ($I_{OR}(j)$) simultaneously using a plurality of photo detectors, and
    the measurement step generates each of object light complex amplitude in-line holograms (g(j)) from each of the off-axis holograms ($I_{OR}(j)$), synthesizes a synthesized hologram by piling up the object light complex amplitude in-line holograms (g(j)) mutually, and uses the synthesized hologram as the object light complex amplitude in-line hologram (g).

6. The method for measuring the three-dimensional shape according to claim 5, wherein
    the measurement step generates the wave-front hologram (h) by the plane wave expansion step in a focal position nearer to the object surface than the hologram plane, cuts out a minute hologram (Δh) including a measurement point (P(xp, yp)) from the wave-front hologram (h), generates a plurality of position-shifted minute holograms (h') having different focal positions based on the minute hologram (Δh), and determines the in-focus point (zp) using the position-shifted minute holograms (h').

7. The method for measuring the three-dimensional shape according to claim 6, wherein
    the measurement step derives a Fourier-transformed function as an in-focus measure (H) by Fourier-transforming a product of the reconstructed image ($|h'|^2$) made of a square of the absolute value of one of the position-shifted minute holograms (h') and a window function (W) using the single spatial frequency (fi), and determines the in-focus point (zp) by performing in-focus judgment based on a magnitude of the in-focus measure (H) derived for each of the position-shifted minute holograms (h').

8. The method for measuring the three-dimensional shape according to claim 7, wherein
the window function (W) is a window function of a Gauss function type.

9. The method for measuring the three-dimensional shape according to claim 8, wherein
the measurement step derives a gradient vector ($\Delta$) of the object surface corresponding to the reconstructed image ($|\Delta h|^2$) where the reconstructed image ($|\Delta h|^2$) is made of the square of the absolute value of the minute hologram ($\Delta h$), and adjusts a window size and a window direction of the window function (W) based on the gradient vector ($\Delta$).

10. The method for measuring the three-dimensional shape according to claim 7, wherein
the measurement step derives a gradient vector ($\Delta$) of the object surface corresponding to the reconstructed image ($|\Delta h|^2$) where the reconstructed image ($|\Delta h|^2$) is made of the square of the absolute value of the minute hologram ($\Delta h$), and adjusts a window size and a window direction of the window function (W) based on the gradient vector ($\Delta$).

11. The method for measuring the three-dimensional shape according to claim 4, wherein
the measurement step generates the wave-front hologram (h) by the plane wave expansion step in a focal position nearer to the object surface than the hologram plane, cuts out a minute hologram ($\Delta h$) including a measurement point (P(xp, yp)) from the wave-front hologram (h), generates a plurality of position-shifted minute holograms (h') having different focal positions based on the minute hologram ($\Delta h$), and determines the in-focus point (zp) using the position-shifted minute holograms (h').

12. The method for measuring the three-dimensional shape according to claim 11, wherein
the measurement step derives a Fourier-transformed function as an in-focus measure (H) by Fourier-transforming a product of the reconstructed image ($|h|^2$) made of a square of the absolute value of one of the position-shifted minute holograms (h') and a window function (W) using the single spatial frequency (fi), and determines the in-focus point (zp) by performing in-focus judgment based on a magnitude of the in-focus measure (H) derived for each of the position-shifted minute holograms (h').

13. The method for measuring the three-dimensional shape according to claim 12, wherein
the window function (W) is a window function of a Gauss function type.

14. The method for measuring the three-dimensional shape according to claim 13, wherein
the measurement step derives a gradient vector ($\Delta$) of the object surface corresponding to the reconstructed image ($|\Delta h|^2$) where the reconstructed image ($|\Delta h|^2$) is made of the square of the absolute value of the minute hologram ($\Delta h$), and adjusts a window size and a window direction of the window function (W) based on the gradient vector ($\Delta$).

15. The method for measuring the three-dimensional shape according to claim 12, wherein
the measurement step derives a gradient vector ($\Delta$) of the object surface corresponding to the reconstructed image ($|\Delta h|^2$) where the reconstructed image ($|\Delta h|^2$) is made of the square of the absolute value of the minute hologram ($\Delta h$), and adjusts a window size and a window direction of the window function (W) based on the gradient vector ($\Delta$).

16. The method for measuring the three-dimensional shape according to claim 1, wherein
the interference fringe pattern (F) projected onto the object surface in the projection step has sinusoidal light intensity.

17. The method for measuring the three-dimensional shape according to claim 16, wherein
the projection step prepares the interference fringe pattern (F) to be projected onto the object surface by interference between two mutually coherent laser beams, and projects the interference fringe pattern (F) onto the object surface so that an arrangement of the interference fringe pattern (F) seen from a light receiving surface of the photo detector may be fixed irrespective of positions of the object surface.

18. The method for measuring the three-dimensional shape according to claim 1, wherein
the projection step prepares the interference fringe pattern (F) to be projected onto the object surface by interference between two mutually coherent laser beams, and projects the interference fringe pattern (F) onto the object surface so that an arrangement of the interference fringe pattern (F) seen from a light receiving surface of the photo detector may be fixed irrespective of positions of the object surface.

19. A device for measuring a three-dimensional shape comprising:
a projection part which prepares an interference fringe pattern (F) having a single spatial frequency (fi) and sinusoidal light intensity by interference between two mutually coherent laser beams, and projects the interference fringe pattern (F) onto an object surface;
a recording part which records the interference fringe pattern (F) projected onto the object surface by the projection part in a digital hologram as an off-axis digital hologram ($I_{OR}$) using a photo detector; and
a measurement part which generates a plurality of reconstructed images having different focal distances from the digital hologram recorded by the recording part, and derives a distance to each point on the object surface by applying a focusing method to the interference fringe pattern (F) in each of the reconstructed images, wherein
the measurement part comprises an interference fringe pattern extraction part for extracting a component of the single spatial frequency (fi) corresponding to the interference fringe pattern from each of the reconstructed images by spatial frequency filtering.

20. The device for measuring the three-dimensional shape according to claim 19, wherein
the projection part projects the interference fringe pattern (F) onto the object surface so that an arrangement of the interference fringe pattern (F) seen from a light receiving surface of the photo detector may be fixed irrespective of positions of the object surface.

* * * * *